United States Patent
Masuko

(10) Patent No.: US 9,256,921 B2
(45) Date of Patent: Feb. 9, 2016

(54) IMAGE GENERATION DEVICE, IMAGE GENERATION METHOD, IMAGE GENERATION PROGRAM, AND RECORDING MEDIUM

(75) Inventor: Soh Masuko, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 163 days.

(21) Appl. No.: 13/518,754

(22) PCT Filed: Dec. 27, 2010

(86) PCT No.: PCT/JP2010/073581
§ 371 (c)(1),
(2), (4) Date: Jun. 22, 2012

(87) PCT Pub. No.: WO2011/078379
PCT Pub. Date: Jun. 30, 2011

(65) Prior Publication Data
US 2012/0268488 A1 Oct. 25, 2012

(30) Foreign Application Priority Data
Dec. 25, 2009 (JP) ................................ 2009-295750

(51) Int. Cl.
G09G 5/00 (2006.01)
G06T 3/40 (2006.01)
H04N 1/387 (2006.01)

(52) U.S. Cl.
CPC ............ *G06T 3/4038* (2013.01); *H04N 1/3876* (2013.01)

(58) Field of Classification Search
CPC .............................. G06T 3/4038; H04N 1/3876
USPC ........................................................ 345/629
See application file for complete search history.

(56) References Cited

U.S. PATENT DOCUMENTS 5,986,668 A * 11/1999 Szeliski et al. ................ 345/634
6,018,349 A * 1/2000 Szeliski et al. ................ 345/629

(Continued)

FOREIGN PATENT DOCUMENTS

EP 2 104 071 A1 9/2009
JP 2003-078767 A 3/2003

(Continued)

OTHER PUBLICATIONS

International Search Report of PCT/JP2010/073581, dated Mar. 15, 2011.

(Continued)

*Primary Examiner* — Charles Tseng
(74) *Attorney, Agent, or Firm* — Sughrue Mion, PLLC

(57) ABSTRACT

An image generation device generates a mosaic image which is suitable for users to see even if sufficient images are not acquired to complete the mosaic image. The image generation device specifies, in units of divided areas, an image area in which an image is drawn in each layer of a plurality of layers divided into the plurality of divided areas, allocates the acquired image to the divided areas in the image area of one of the layers, based on color information of the acquired image and color information of each of the divided areas in the specified image area, and generates a mosaic image by superimposing, between layers, the image allocated in the image area of two or more layers of the plurality of layers in which an image is allocated to at least one of all of the divided areas in the image area of each of the layers and the divided areas of another layer having a display position which overlaps the divided areas.

8 Claims, 30 Drawing Sheets

(56) References Cited

U.S. PATENT DOCUMENTS

| | | | |
|---|---|---|---|
| 6,075,905 A * | 6/2000 | Herman et al. | 382/284 |
| 6,097,854 A * | 8/2000 | Szeliski et al. | 382/284 |
| 6,137,498 A * | 10/2000 | Silvers | 345/629 |
| 6,393,163 B1 * | 5/2002 | Burt et al. | 382/294 |
| 6,404,903 B2 * | 6/2002 | Okano et al. | 382/117 |
| 6,556,210 B1 * | 4/2003 | Yamamoto et al. | 345/582 |
| 6,927,874 B1 * | 8/2005 | Enokida et al. | 358/1.18 |
| 7,565,028 B2 * | 7/2009 | Saed | 382/284 |
| 8,233,740 B2 * | 7/2012 | Roth | 382/284 |
| 2004/0217980 A1 * | 11/2004 | Radburn et al. | 345/672 |
| 2008/0133258 A1 * | 6/2008 | Kontogouris | 705/1 |
| 2009/0141043 A1 * | 6/2009 | Guo et al. | 345/629 |
| 2010/0277754 A1 * | 11/2010 | Arimura et al. | 358/1.9 |

FOREIGN PATENT DOCUMENTS

| | | | |
|---|---|---|---|
| JP | 2004-157578 A | | 6/2004 |
| JP | 2004-334467 | * | 11/2004 |
| JP | 2004-334467 A | | 11/2004 |
| JP | 2006-039800 A | | 2/2006 |
| JP | 2006-313497 A | | 11/2006 |
| JP | 2008-108027 A | | 5/2008 |
| JP | 2009-080828 A | | 4/2009 |
| JP | 2010-004166 A | | 1/2010 |
| JP | 4191791 B1 | | 1/2010 |
| WO | 98/28909 A1 | | 7/1998 |
| WO | 2009/090901 A1 | | 7/2009 |

OTHER PUBLICATIONS

English Translation of Chinese Office Action dated May 21, 2013, issued in Chinese Patent Application No. 201080058094.8.
Liu Xiao-Hui, Xi Zhi-Hong, Xiao Chun-Li; Research on layering large-data image; Applied Science and Technology, Jun. 2009, pp. 17-20, vol. 36, No. 6, College of Information and Communication Engineering, Harbin Engineering University, Harbin 150001, China.
Chinese Office Action dated May 21, 2013, issued in Chinese Patent Application No. 201080058094.8.
Extended European Search Report dated Jun. 10, 2013, issued in European Patent Application No. 10839607.8.
Jeong Eun Kim et al., "The Decorative PixMosaics: Using Direction Photo Tiles," International Conference on Computer Graphics, Imaging and Visualization, Jan. 1, 2005, pp. 339-344.
Wiley K. et al., "Representing Interwoven Surfaces in 2-1/2D Drawings," IEEE Computer Graphics and Applications, IEEE Service Center, New York, NY, US, vol. 17, No. 4, Jul. 1, 2007, pp. 70-83.

* cited by examiner

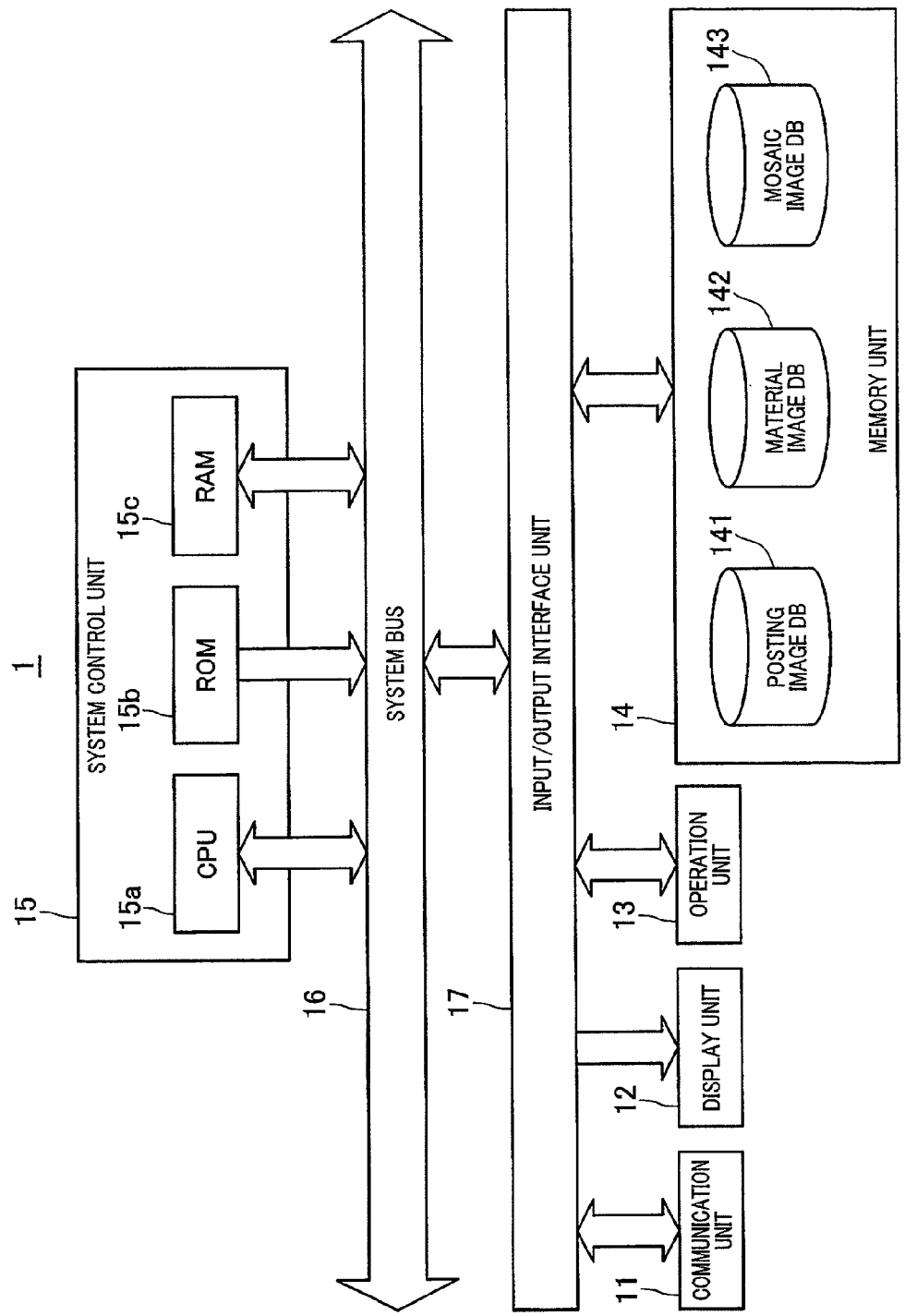

FIG.5A

POSTING IMAGE DB

| POSTING IMAGE NUMBER |
| --- |
| POSTING IMAGE |
| USER ID |
| COLOR INFORMATION |
| REPRESENTATIVE COLOR INFORMATION |

FIG.5B

MATERIAL IMAGE DB

| MATERIAL IMAGE ID |
| --- |
| MATERIAL IMAGE |
| NUMBER OF DIVISIONS |
| NUMBER OF LAYERS |
| DISPLAY ORDER FLAG |
| POINT ASSIGNING LAYER INFORMATION |
| LAYER INFORMATION 1 |
| LAYER INFORMATION 2 |
| . . . |

FIG.5C

LAYER INFORMATION

| LAYER ID |
| --- |
| LAYER IMAGE |
| DISPLAY ORDER |
| Z ORDER |
| LAYER IMAGE INFORMATION |
| REPRESENTATIVE COLOR INFORMATION |
| IMAGE AREA INFORMATION |
| OUTLINE INFORMATION |
| POINT ASSIGNING AREA INFORMATION |
| COLOR INFORMATION OF DIVIDED AREA 1 |
| COLOR INFORMATION OF DIVIDED AREA 2 |
| . . . |

FIG.5D

MOSAIC IMAGE DB

| MOSAIC IMAGE ID |
| --- |
| MOSAIC IMAGE (TABLE PART DATA) |

FIG.5E

USER INFORMATION DB

| USER ID |
| --- |
| PASSWORD |
| NAME |
| DATE OF BIRTH |
| SEX |
| HOMETOWN |
| TELEPHONE NUMBER |
| ELECTRONIC MAIL ADDRESS |
| NUMBER OF HOLDING POINTS |
| HOBBY |
| PROFILE URL |
| . . . |

DISPLAY ORDER=1   Z ORDER=3

DISPLAY ORDER=2   Z ORDER=1

DISPLAY ORDER=3  Z ORDER=2

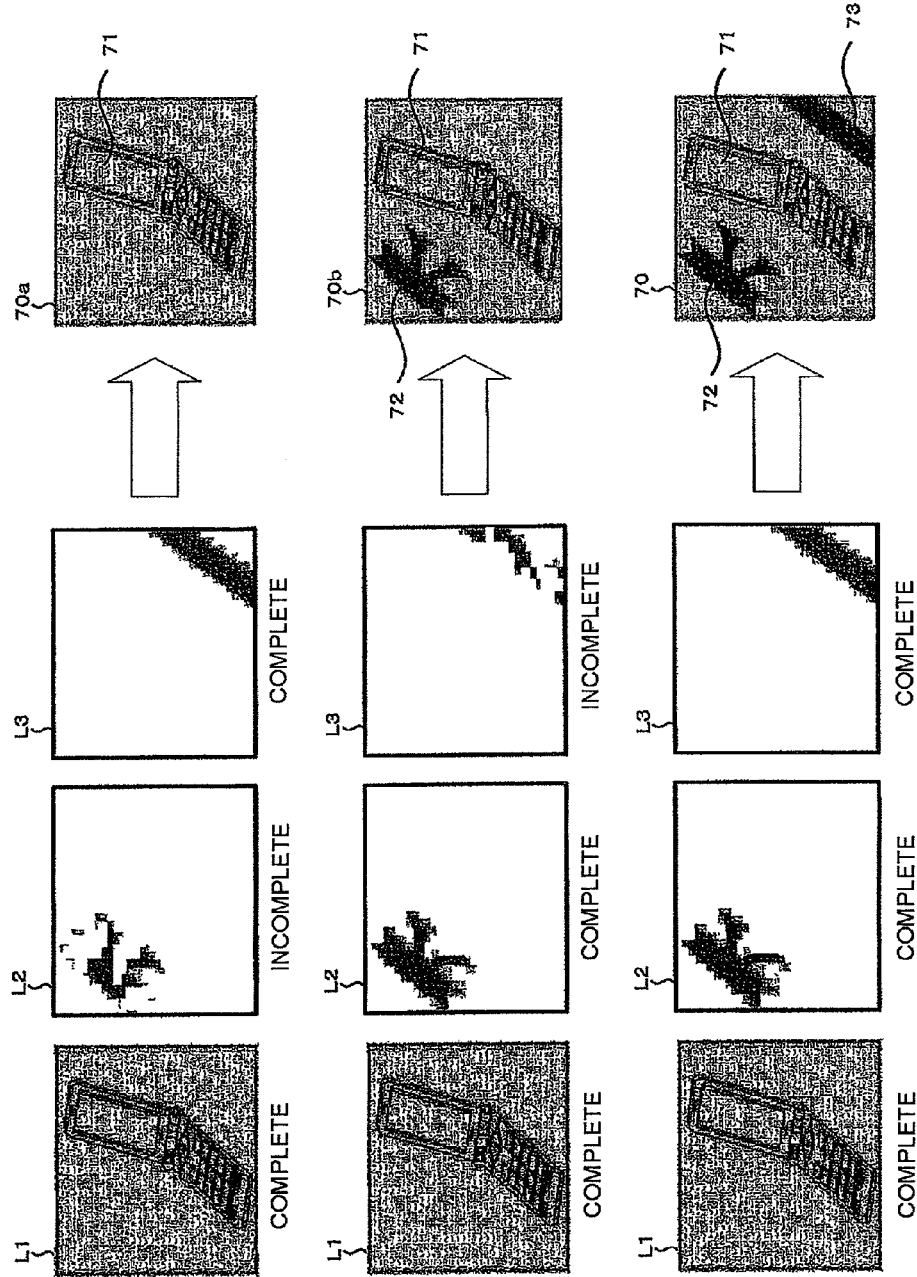

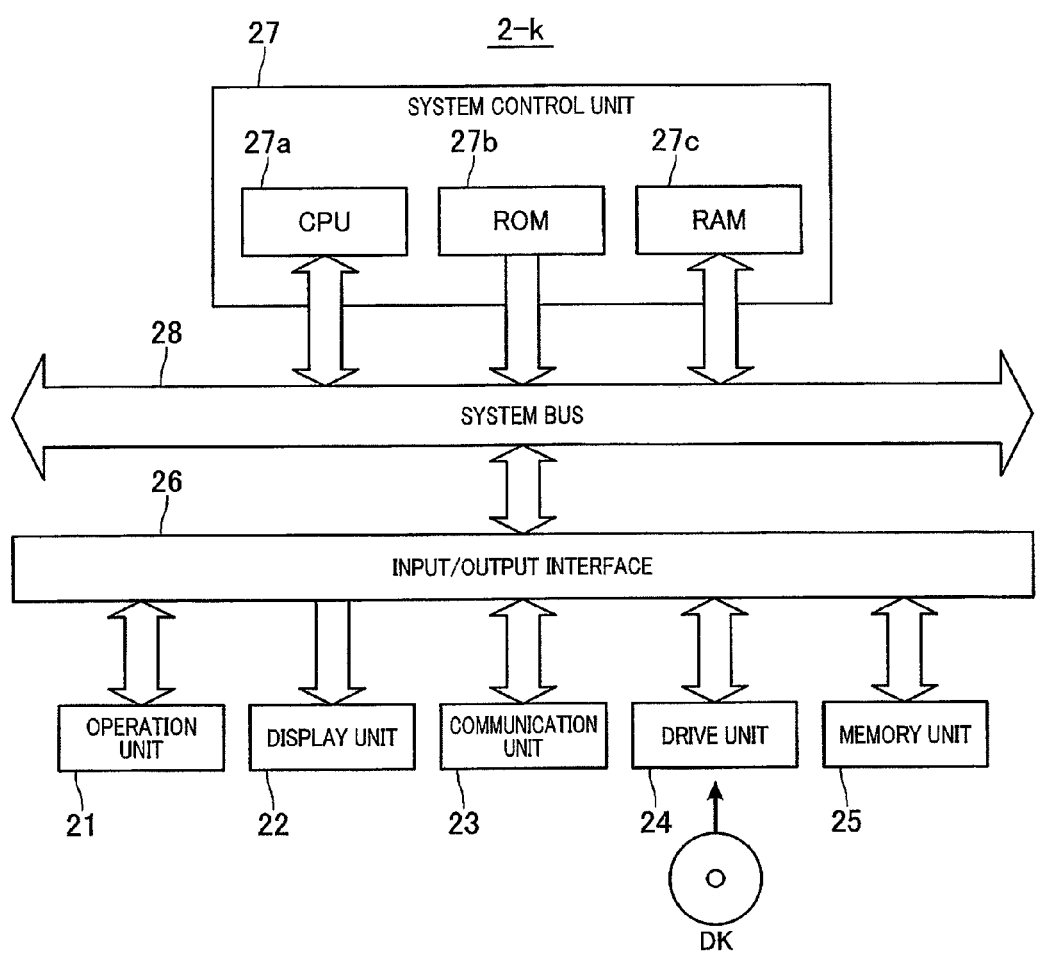

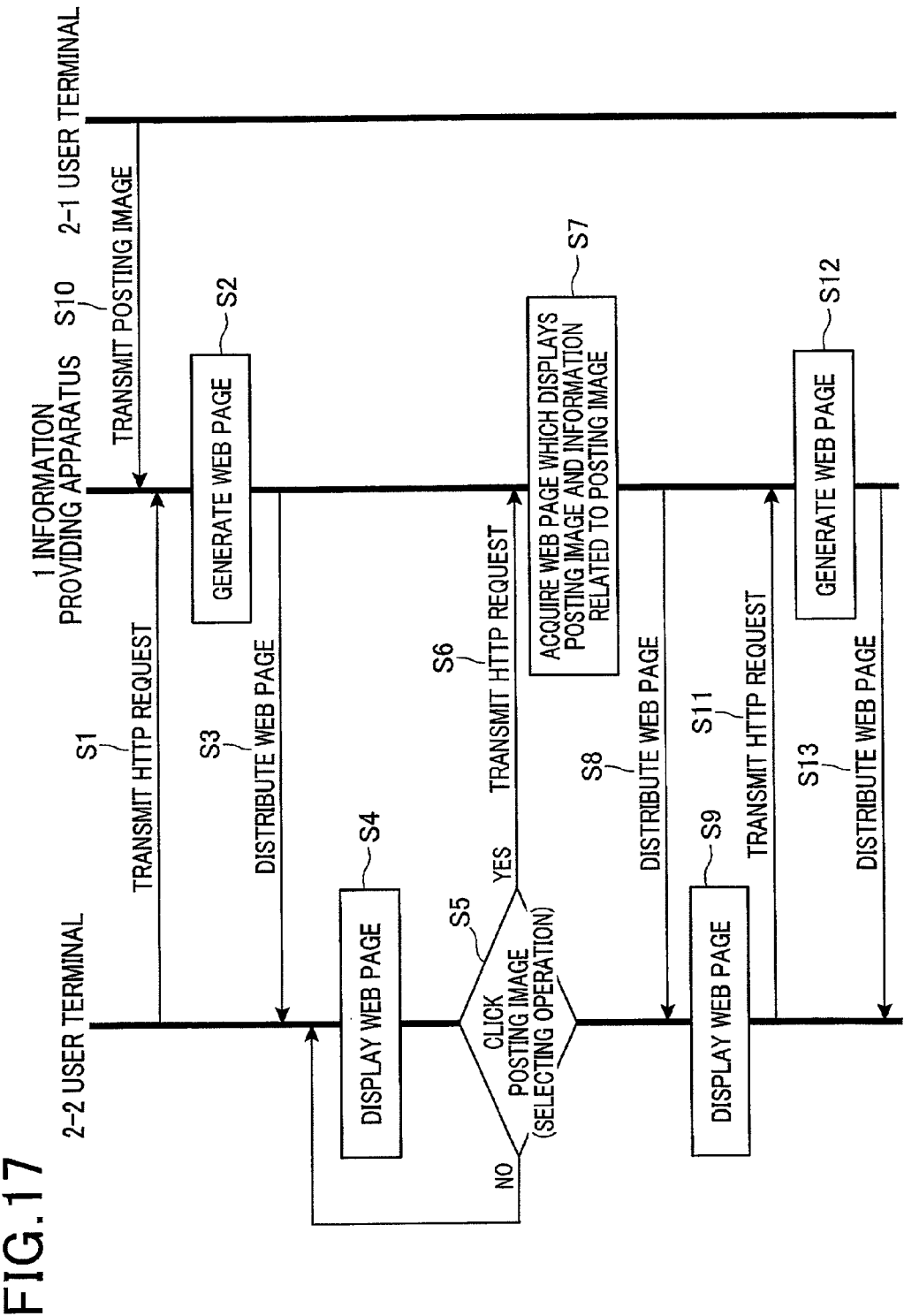

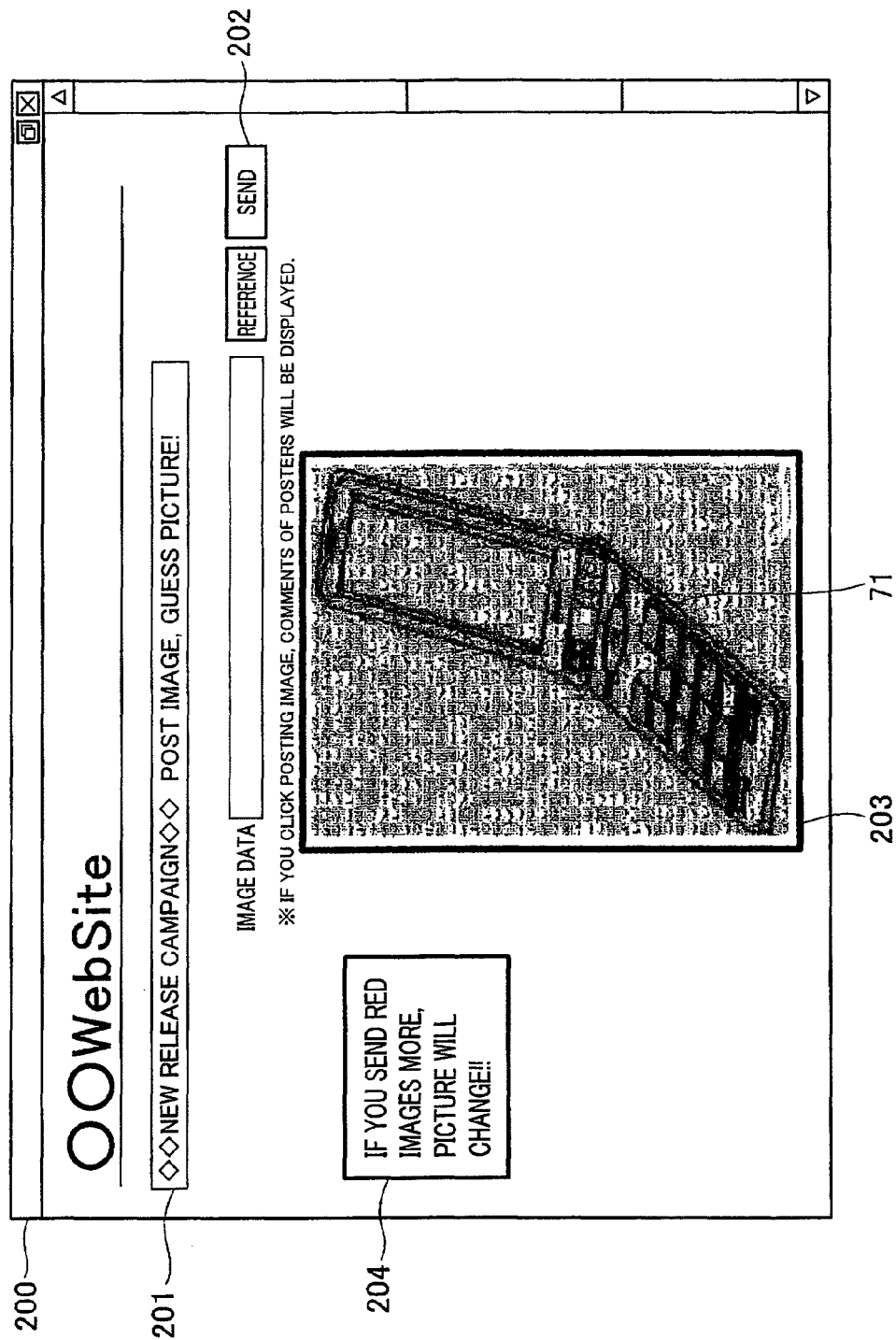

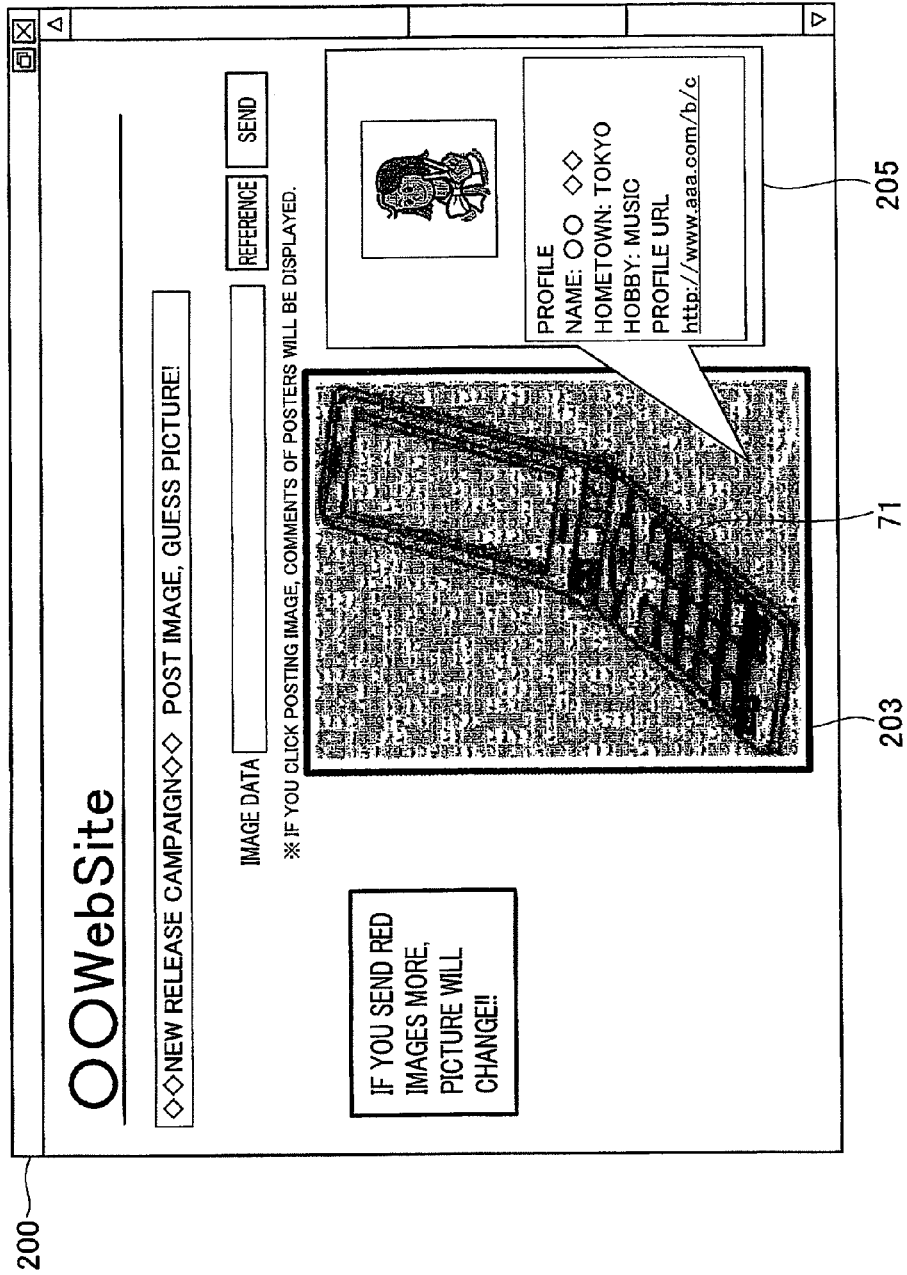

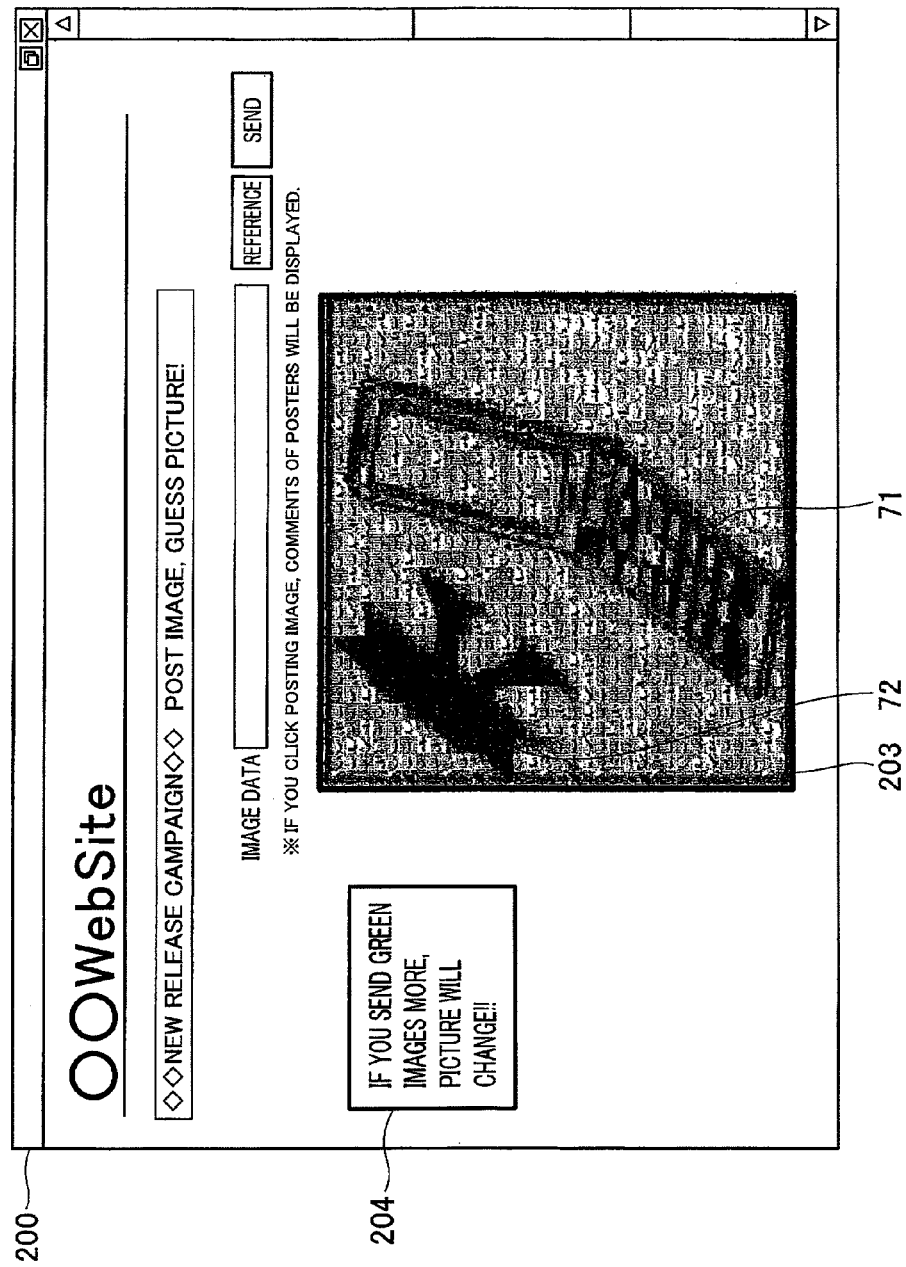

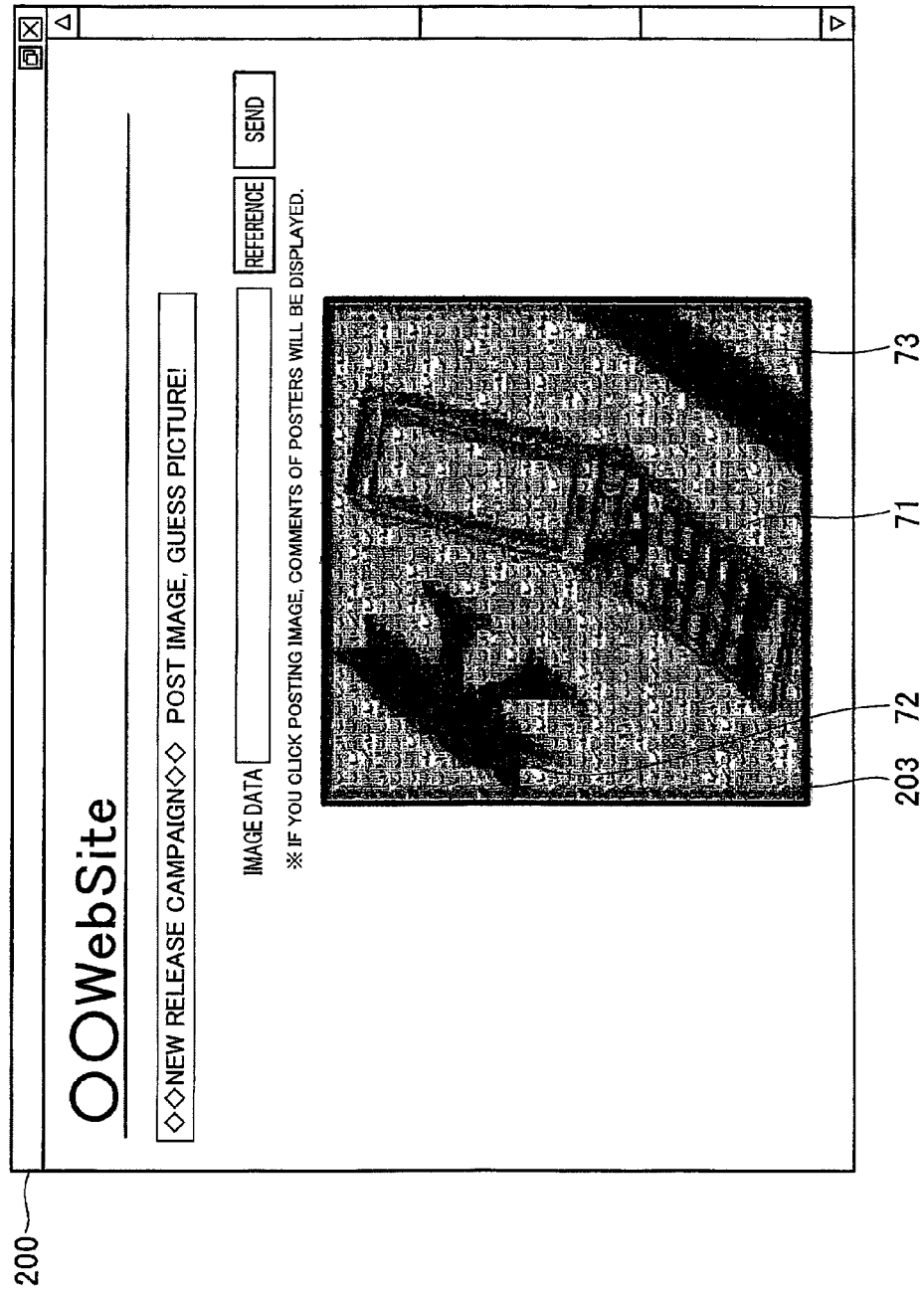

IMAGE GENERATION DEVICE, IMAGE GENERATION METHOD, IMAGE GENERATION PROGRAM, AND RECORDING MEDIUM

TECHNICAL FIELD

The present invention relates to a technical field of, for example, an information providing device which provides pages (web pages) listing predetermined information, to terminal devices such as personal computers connected through a network such as Internet and, more particularly, relates to a technique of creating and providing pages listing information related to posted images.

BACKGROUND ART

Conventionally, synthetic images which are referred to as "mosaic art" (mosaic images and photo mosaics) are known as expression methods for posters, web pages and the like used for advertising new products or announcing events.

For example, the mosaic art can be generated by selecting in advance an image showing a picture (design) which is the source of the mosaic image, and generating divided areas by dividing the source image into a plurality of areas. Further, this method includes generating a mosaic image by extracting a plurality of images which are similar to color information (such as chromaticity data such as RGB) of the divided areas and match the divided areas, and combining the extracted images in a tile pattern. By this means, a mosaic image which imitates a source image is generated.

Patent Literature 1 discloses a technique of generating a mosaic image provided to a terminal device, using an image posted by a user. With this technique disclosed in Patent Literature 1, a mosaic image comes closer to completion a little by little in proportion to an increase in a number of posted images.

CITATION LIST

Patent Literature

Patent Literature 1: Japanese Patent Application Laid-Open No. 2010-4166

SUMMARY OF INVENTION

Problem to be Solved by the Invention

However, with the technique disclosed in Patent Literature 1, a mosaic image is not completed unless sufficiently necessary images are acquired from users. Hence, until sufficient images are required, an incomplete mosaic image is displayed on a terminal device. There are image defect portions in the incomplete mosaic image, and therefore a mosaic image is displayed in some cases in a state which the mosaic image is suitable to enjoy.

Hence, to avoid this, a condition that a mosaic image is completed is set to display this mosaic image. In view of this, users cannot see a mosaic image while sufficient images are not acquired.

The present invention is made in light of the above problem, and the object of the present invention is to provide an image generation device, an image generation method, an image generation program and a recording medium which can generate a mosaic image which is suitable for users to see even when sufficient images are not acquired to generate the mosaic image.

Means for Solving the Problem

In order to solve the above problem, an aspect of the invention provides an image generation device, comprising:

an acquiring means that acquires an image from a terminal device through a network;

a specifying means that specifies, in units of divided areas, an image area in which an image is drawn in each layer of a plurality of layers which configure a material image which is a source of a mosaic image and which are divided into the plurality of divided areas;

an allocating means that allocates the image acquired by the acquiring means to the divided areas in the image area of one of the layers, based on color information of the image acquired by the acquiring means and color information of each of the divided areas in the image area specified by the specifying means; and a generating means that generates a mosaic image by superimposing, between layers, the image allocated in the image area of two or more layers of the plurality of layers in which an image is allocated to at least one of all of the divided areas in the image area of each of the layers and the divided areas of another layer comprising a display position which overlaps the divided areas.

According to the present invention, a material image which is a source of a mosaic image is configured with a plurality of layers. That is, the source material image is expressed by superimposing a plurality of layers. Images in each layer each configure the material image.

Images acquired from the terminal device are allocated in an area in which one layer image is drawn. Further, when images are allocated to all divided areas in an image area of each layer of two or more layers or when images are allocated to divided areas of another layer having a display position which overlaps divided areas even if there are the divided areas to which posting images are not allocated, a mosaic image is generated by superimposing between layers images allocated in the image areas of the two or more layers.

In some cases, the mosaic image generated in this way is not completed as a mosaic image which imitates a material image. However, when images are allocated to all divided areas in an image area of a given layer, this mosaic image is completed as a mosaic image which imitates an image drawn in this layer. Alternatively, even when images are not allocated to some divided areas in an image area of a given layer, images are allocated to divided areas of another layer having a display position which overlaps these divided areas. Hence, the mosaic image in the image area of this layer includes no image defect portion.

Consequently, it is possible to generate a mosaic image without image defect portions as a mosaic image which imitates an image configuring a material image, and generate the mosaic image as a more perfect mosaic image which imitates a material image. Consequently, it is possible to generate a mosaic image which is suitable for users to see even when sufficient images are not acquired to complete the mosaic image which imitates the material image.

Another aspect provides the image generation device, wherein when allocation of an image in the image area of one of the layers is completed by the allocating means, the generating means generates a mosaic image configured with the image allocated in the image area of the layer, and after the mosaic image is generated, when a number of layers for which allocation of the image in the image area is completed increases in proportion to an increase in a number of images acquired by the acquiring means, the generating means generates a mosaic image by superimposing between layers an image allocated in the image area of each of the layers for which allocation of the image in the image area is completed.

According to the present invention, images acquired from the terminal device are allocated in an area in which one layer image is drawn. Further, when allocation of images in the area in which one layer image is drawn is completed, a mosaic image matching this layer is generated. Although the generated mosaic image is not completed as a mosaic image which imitates a material image, this mosaic image is completed as a mosaic image which imitates an image configuring the material image.

Subsequently, in response to an increase of the number of acquired images, allocation of images in the area in which the image of another layer is drawn is completed. Then, images allocated in the image area of each layer in which allocation of images in the image area is completed are superimposed between layers to generate a mosaic image. By this means, the number of images imitated by a mosaic images increases, so that a mosaic image which imitates a plurality of images configuring the material image is completed.

Consequently, it is possible to generate a mosaic image as a mosaic image which imitates an image configuring a material image, and generate the mosaic image as a more perfect mosaic image which imitates a material image. Consequently, it is possible to generate a mosaic image which is suitable for users to see even when sufficient images are not acquired to complete the mosaic image which imitates the material image.

Another aspect provides the image generation device, further comprising an order information acquiring means that acquires order information indicating a display order of each of the layers, wherein when allocation of the image in the image area of the layer of an earliest display order indicated by the order information among the plurality of layers is completed, the generating means generates a mosaic image configured with the image allocated in the image area of the layer, and the generating means further generates a mosaic image by superimposing between layers the image allocated in the image area of the layer following the earliest display order indicated by the order information among the layers for which allocation of the image in the image area is completed.

According to the present invention, the number of images imitated by a mosaic image to be generated increases according to an order indicated by order information. Consequently, it is possible to increase the number of images imitated by the mosaic image based on an intention of a user who provides the mosaic image.

Another aspect provides the image generation device, further comprising a deciding means that decides whether or not there is the divided area which is suitable to allocate the image acquired by the acquiring means, based on color information of the image acquired by the acquiring means and color information of each of the divided areas, wherein, when the deciding means decides that there is not the divided area which is suitable to allocate the image acquired by the acquiring means, the generating means does not use the image acquired by the acquiring means to generate a mosaic image.

According to the present invention, when the image acquired by the terminal device is not suitable for any divided area, this image is not used to generate a mosaic image. Consequently, it is possible to generate a mosaic image which more faithfully imitates a material image.

Another aspect provides the image generation device, wherein the acquiring means acquires an image to be posted and identification information of a user who posts an image from the terminal device, and the image generation device further comprises an assigning means thai, when the allocating means allocates the image acquired by the acquiring means in the image area of the layer through which points are set to be assigned, updates point count information by adding a number of assigning points to a number of points indicated by (he point count information associated with the identification information acquired by the acquiring means, among the point count information stored in a point count information memory means thai associates and stores the point count information indicating a number of points held by the user, and the identification information of the user.

According to the present invention, when an image is allocated to a layer set in advance, points are assigned to a user who has posted this image. By this means, it is possible to encourage user's motivation of posting images. Consequently, it is possible to generate a mosaic image as a more perfect mosaic image which imitates a material image.

Another aspect provides the image generation device, wherein the acquiring means acquires an image posted by a user from the terminal device, and the image generation device further comprises:

a mosaic image transmitting means that transmits display information for displaying the mosaic image generated by the generating means, to the terminal device through the network;

a receiving means that receives request information which is transmitted from the terminal device when the user selects an image included in the mosaic image displayed on the terminal device based on the display information, and which indicates a request of a profile of a user who has posted the selected image; and a profile information transmitting means that transmits profile information indicating the profile of the user matching the request information received by the receiving means, to the terminal device which is a transmission source of the request information.

According to the present invention, users who browse a mosaic image can acquire a profile of a user who has posted an image included in the displayed mosaic image. Consequently, it is possible to encourage user's motivation of browsing a mosaic image.

Another aspect provides an image generation method in an image generation device which generates a mosaic image, the image generation method comprising:

a specifying step of specifying, in units of divided areas, an image area in which an image is drawn in each layer of a plurality of layers which configure a material image which is a source of a mosaic image and which are divided into the plurality of divided areas;

an allocating step of allocating the image acquired in the acquiring step to the divided areas in the image area of one of the layers, based on color information of the image acquired in the acquiring step and color information of each of the divided areas in the image area specified in the specifying step; and a generating step of generating a mosaic image by superimposing, between layers, the image allocated in the image area of two or more layers of the plurality of layers in which an image is allocated to at least one of all of the divided areas in the image area of each of the layers and the divided areas of another layer comprising a display position which overlaps the divided areas.

Another aspect provides an image generation program causing a computer included in an image generation device which generates a mosaic image, to execute:

a specifying step of specifying, in units of divided areas, an image area in which an image is drawn in each layer of a plurality of layers divided into the plurality of divided areas;

an allocating step of allocating the image acquired in the acquiring step to the divided areas in the image area of one of the layers, based on color information of the image acquired in the acquiring step and color information of each of the divided areas in the image area specified in the specifying step; and a generating step of generating a mosaic image by superimposing, between layers, the image allocated in the image area of two or more layers of the plurality of layers in which an image is allocated to at least one of all of the divided areas in the image area of each of the layers and the divided areas of another layer comprising a display position which overlaps the divided areas.

Another aspect provides a recording medium having a computer-readable image generation program recorded therein which causes a computer included in an image generation device which generates a mosaic image, to execute:

a specifying step of specifying, in units of divided areas, an image area in which an image is drawn in each layer of a plurality of layers divided into the plurality of divided areas;

an allocating step of allocating the image acquired in the acquiring step to the divided areas in the image area of one of the layers, based on color information of the image acquired in the acquiring step and color information of each of the divided areas in the image area specified in the specifying step; and a generating step of generating a mosaic image by superimposing, between layers, the image allocated in the image area of two or more layers of the plurality of layers in which an image is allocated to at lease one of all of the divided areas in the image area of each of the layers and the divided areas of another layer comprising a display position which overlaps the divided areas.

Effects of Invention

According to the present invention, it is possible to generate a mosaic image without image defect portions as a mosaic image which imitates an image configuring a material image, and generate the mosaic image as a more perfect mosaic image which imitates a material image. Consequently, it is possible to generate a mosaic image which is suitable for users to see even when sufficient images are not acquired to complete the mosaic image which imitates the material image.

BRIEF DESCRIPTION OF DRAWINGS

FIG. 4 is a block diagram illustrating an example of a schematic configuration of the information providing device 1 according to an embodiment.

FIG. 5A is a view illustrating an example of content registered in a posting image DB 141, FIG. 5B is a view illustrating an example of content registered in a material image DB 142, FIG. 5D is a view illustrating an example of content set to layer information, FIG. 5D is a view illustrating an example of content registered in a mosaic image DB 143 and FIG. 5E is a view illustrating an example of content registered in a user information DB.

FIGS. 10A to C are views illustrating examples of a relationship between a state of allocated posing images in each layer and a generated mosaic image.

FIG. 16 is a block diagram illustrating a schematic configuration example of a user terminal 2-k.

FIG. 17 is a sequence diagram illustrating an operation of the information providing device 1 matching a request of the user terminal 2-k according to an embodiment.

FIG. 23 is a view illustrating a mosaic image shown on a display of a display unit 22.

FIG. 24 is a view illustrating a mosaic image shown on the display of the display unit 22.

FIG. 25 is a view illustrating a mosaic image shown on the display of the display unit 22.

FIG. 26 is a view illustrating a mosaic image shown on the display of the display unit 22.

MODE FOR CARRYING OUT THE INVENTION

Hereinafter, embodiments of the present invention will be described with reference to the drawings. In addition, the embodiments will be described below where the present invention is applied to an information providing device 1.
[First Embodiment]

First, a configuration and an outline of a function of an information providing device 1 according to an embodiment of the present invention will be described using FIG. 1.

Figure 1:
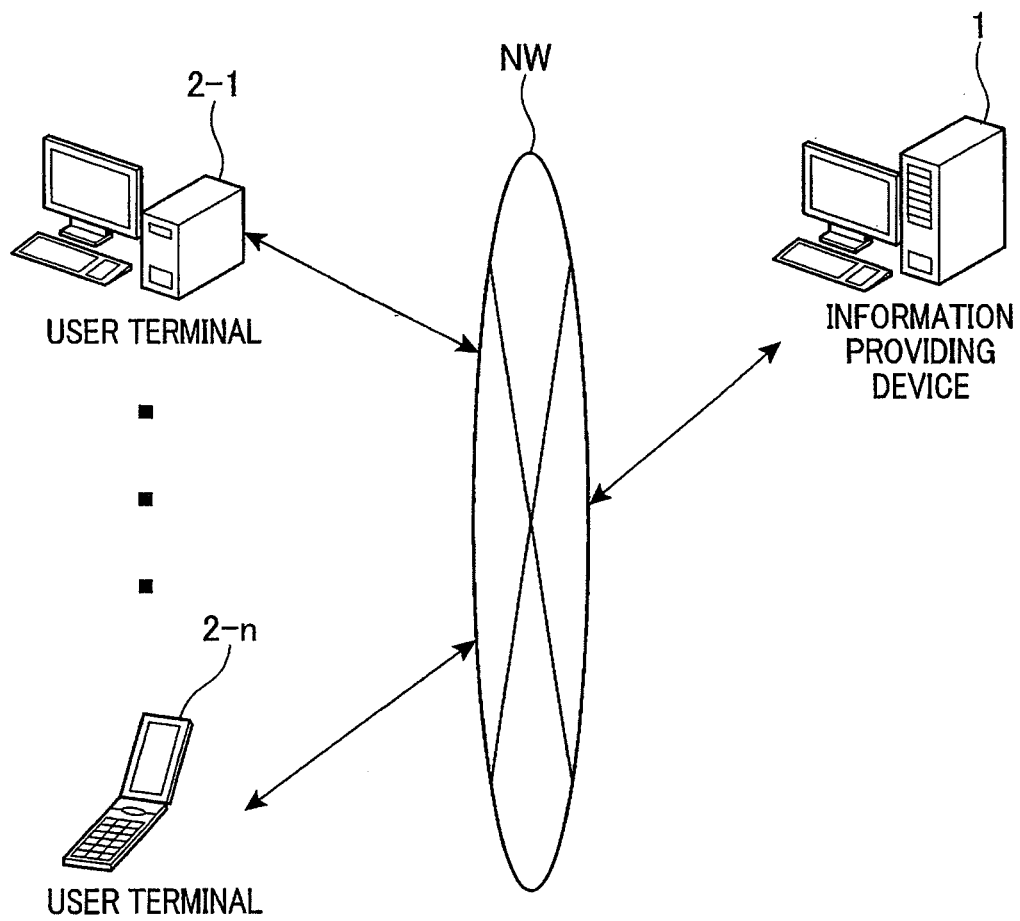
FIG. 1 is a view illustrating an example of a schematic configuration of an information providing system including an information providing device 1 according to an embodiment.

FIG. 1 is a view illustrating an example of a schematic configuration of an information providing system according to the present embodiment.

As illustrated in FIG. 1, the information providing system is configured to include the information providing device 1 and a plurality of user terminals 2-$k$ (k=1 and 2 to n). Further, the information providing device 1 and each of the user terminals 2-$k$ (k=1 and 2 to n) can transmit and receive data to and from each other using, for example, TCP/IP for a communication protocol through a network NW. In addition, the network NW is constructed with, for example, Internet, a dedicated communication line (for example, CATV (Community Antenna Television) line), a mobile communication network (including, for example, base stations) and a gateway.

In addition, although only one information providing device 1 is illustrated for ease of description with an example in FIG. 1, there may be a plurality of information providing devices 1. Further, there are the user terminals 2-$k$ per user.

With this configuration, the information providing device 1 is, for example, a web server which is installed to run an information providing site which provides various pieces of information and services. This information providing device 1 transmits to the user terminal 2-$k$ a web page according to a HTTP (Hyper Text Transfer Protocol) request from the user terminal 2-$k$. Further, the user terminal 2-$k$ displays, for example, the received web page on a window screen shown on a display by means of a web browser. On the web page displayed in this way, content information is displayed which shows, for example, an outline of a product or service or announces a campaign of this product or service.

Further, a mosaic image is displayed together with or in association with the content information (for example, displayed on a web page of a link source of the content information).

The information providing device 1 generates a mosaic image displayed on a web page to be similar to an image (hereinafter, "material image") selected as an image which shows a picture (design) based on which a mosaic image is generated. To generate a mosaic image, the information providing device 1 acquires an image posted by a user (hereinafter, "posting image") from each user terminal 2-$k$. Further, the information providing device 1 generates a mosaic image which imitates a material image by combining a plurality of posting images.

With a common method of generating a mosaic image, for example, a material image is divided into a plurality of areas (hereinafter, "divided areas"), and an image similar to an image of the divided area is allocated to each divided area. Thus, a mosaic image is generated.

Figure 2A:
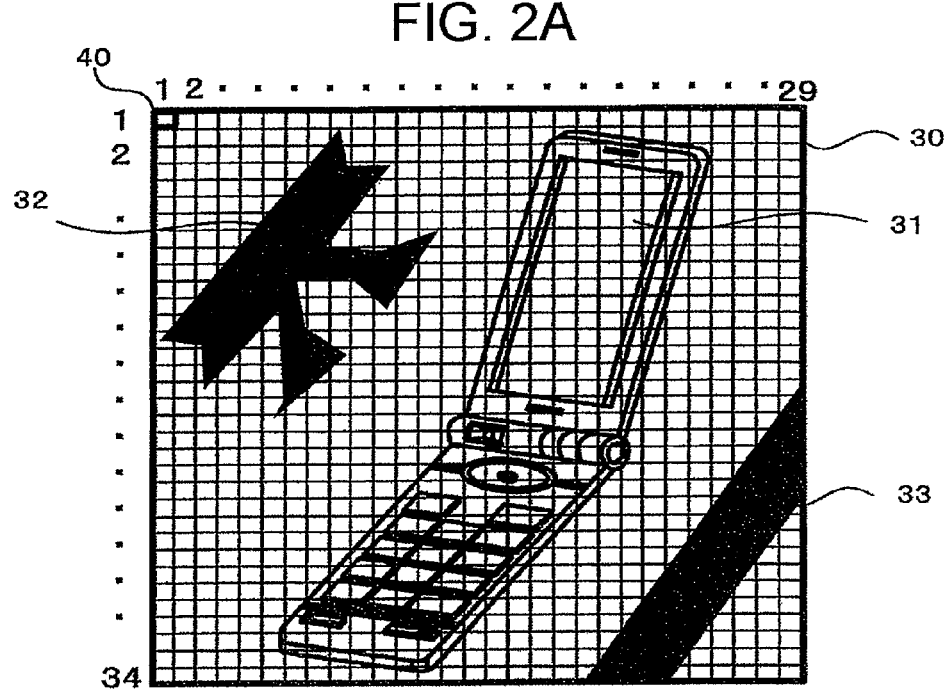
FIG. 2A illustrates a material image 30 showing a mobile telephone and a ribbon.

Hereinafter, an example of a material image will be described. FIG. 2A illustrates a material image 30 which shows a mobile telephone and a ribbon. As illustrated in FIG. 2A, the material image 30 includes a mobile telephone image 31, a ribbon image 32 and a ribbon image 33. That is, the mobile telephone and the ribbon are drawn in the material image 30. Further, the material image 30 is divided into 986 divided areas 40 in total including 34 in a vertical direction and 29 in a horizontal direction.

Figure 2B:
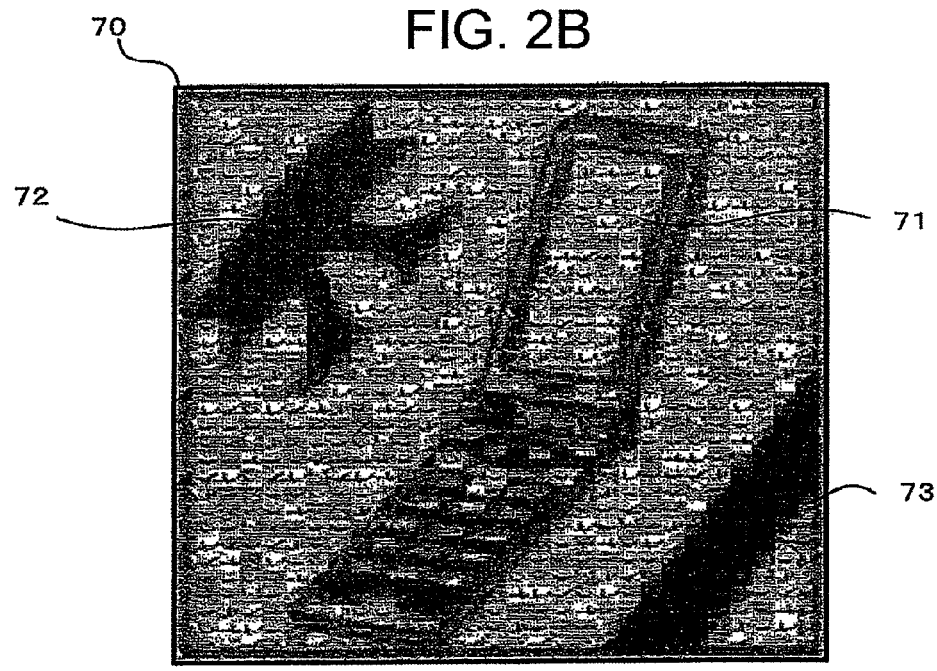
FIG. 2B illustrates a generation example of a mosaic image 70 which imitates the material image 30 showing the mobile telephone and the ribbon.

FIG. 2B illustrates a generation example of a mosaic image 70 which imitates the material image 30 showing a mobile telephone and a ribbon. As illustrated in FIG. 2B, the mosaic image 70 includes a mosaic image 71 which imitates the mobile telephone image 31, a mosaic image 72 which imitates the ribbon image 32 and a mosaic image 73 which imitates the ribbon image 33.

When the mosaic image 70 which imitates the material image 30 is generated by a common method, sufficient posting images suitable for corresponding divided areas are required for the images 31 to 33.

Figure 3:
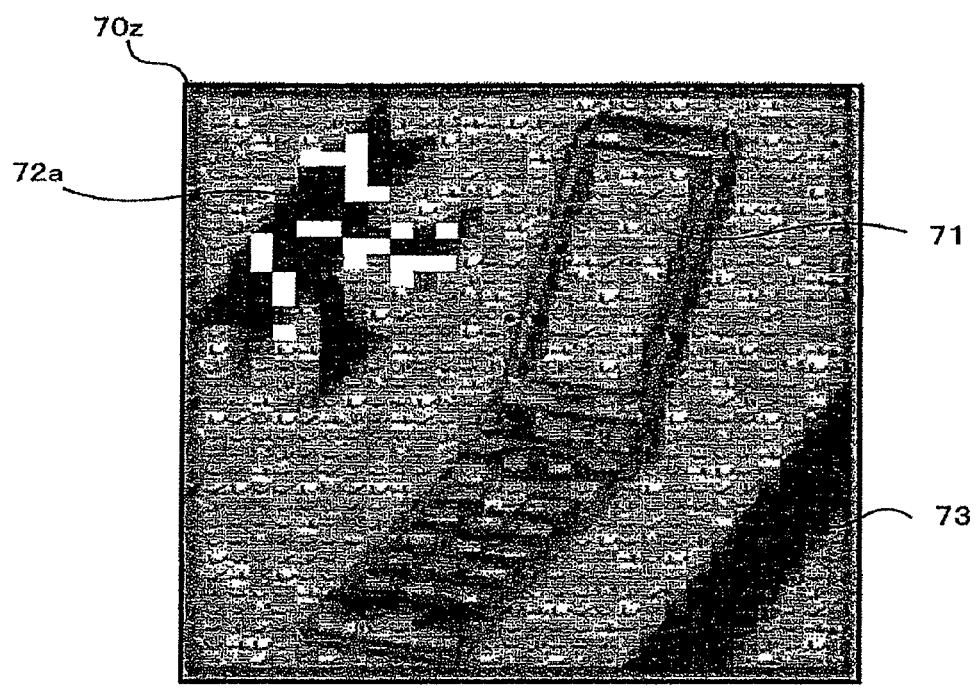
FIG. 3 illustrates a generation example of a mosaic image 70z which imitates the material image 30 showing the mobile telephone and the ribbon.

FIG. 3 illustrates a generation example of a mosaic image 70$z$ which imitates the material image 30 showing the mobile telephone and the ribbon. As illustrated in FIG. 3, the mosaic image 70$z$ includes the mosaic image 71, a mosaic image 72$a$ which imitates the ribbon image 32 and the mosaic image 73.

When, for example, sufficient posting images suitable for the ribbon image 32 are not acquired, there are divided areas to which posting images are not allocated among divided areas corresponding to the ribbon image 32 as illustrated in FIG. 3. Hence, in the mosaic image 70$z$, the mosaic image 72$a$ including partially defect images is displayed. Portions of a mosaic image which imitates the ribbon image 32 are not completed, and the mosaic image 70$z$ gives an incomplete impression to users as a whole. This undermines a motivation of seeing a mosaic image.

By contrast with this, with the present embodiment, a material image is configured with a plurality of layers. In each layer, one image included in a material image is drawn. That is, an image drawn in each layer is a material image in layer units. An image in layer units is referred to as a "layer image" below. Further, the material image is expressed by superimposing a layer image of each layer between layers. Furthermore, each layer is divided into a plurality of divided areas.

The information providing device 1 allocates posting images to divided areas of each layer. Further, by superimposing only layers in which posting images are allocated to the entire layer image all over among all layers, a mosaic image displayed on a web page is generated. By this means, a complete mosaic image of an image in which allocation of posting images is completed in a corresponding layer among a plurality of images included in a material image is shown in a mosaic image in a web page. Consequently, it is possible to avoid giving an incomplete impression.

FIG. 4 is a block diagram illustrating an example of a schematic configuration of the information providing device 1 according to the present embodiment.

As illustrated in FIG. 4, the information providing device 1 has a communication unit 11, a display unit 12, an operation unit 13, a memory unit 14 (an example of point count information memory means), an input/output interface unit 17 and a system control unit 15 (acquiring means, specifying means, generating means, deciding means, assigning means, mosaic image transmitting means, receiving means and profile information transmitting means). Further, the system control unit 15 and the input/output interface unit 17 are connected through a system bus 16.

The communication unit 11 connects to the network NW, and controls communication with the user terminal 2-$k$. Further, the communication unit 11 functions as an interface of connecting to the network NW, and acquiring a posting image transmitted from the user terminal 2-$k$.

The display unit 12 has a display for displaying, for example, the acquired data.

The operation unit 13 has, for example, a keyboard and a mouse.

The memory unit 14 employs a configuration including, for example, a hard disc drive. The memory unit 14 stores various programs such as an operating system and a mosaic image generation program (an example of an image generation program according to the present invention). In addition, the programs such as the mosaic image generation program may be recorded in a recording medium such as a DVD (Digital Versatile Disc) and read through a drive device.

Further, in the memory unit 14, a posting image DB (database) 141, a material image DB 142 and a mosaic image DB 143 are constructed.

In addition, these databases may be constructed in a database server which manages databases. In this case, the information providing device 1 may be configured as a server group configured to include the database server and other servers.

FIG. 5A is a view illustrating an example of content registered in the posting image DB 141. As illustrated in FIG. 5A, in the posting image DB 141, a posting image number, a posting image, a user ID, color information and representative color information are associated per posting image and stored.

The posting image number indicates an order at which a posting image is posted. The posting image number is assigned to each posting image in order from the first. A posting image is image data registered in a format such as JPEG (Joint Photographic Experts Group), TIFF (Tagged-Image File Format) or PNG (Portable Network Graphics). The user ID is identification information of a user who has posted a posting image. In addition, the number of posting images received from the user terminal 2-$k$ and registered in the posting image DB 141 is referred to as "the number of posting images".

The color information is posting image information calculated from a posting image. The color information refers to a value obtained by adopting, for example, known RGB conversion and quantizing a color indicated by the posting image.

Although this RGB conversion is a known technique and will not be described in detail, the system control unit 15 dissolves pixel data configuring a posting image, into R (Red), G (Green) and B (Blue) components per pixel, and quantizes each component with 256 tones. The quantized pixel data is represented by, for example, equation 1.

$$(R=0 \text{ to } 255, G=0 \text{ to } 255 \text{ and } B=0 \text{ to } 255) \quad \text{Equation (1)}$$

The color information is a set of items of pixel data of a posting image. In addition, a method of quantizing a color shown by a posting image is by no means limited to the RGB conversion, and, for example, may adopt CMYK color conversion or Lab color conversion. In addition, depending on a format of a posting image transmitted from the user terminal 2-$k$, information of pixels has in some cases been quantized already. In this case, the system control unit 15 only needs to acquire color information from the posting image. In addition, calculating color information is an example of acquiring color information.

The representative color information indicates, for example, an impression of a color given by one posting image as a whole.

More specifically, when, for example, a difference between a given specific color component (for example, one of R, G and B) and other color components in pixel data configuring the RGB-converted posting image is a threshold set in advance or more, representative color information of a posting image indicates an impression of a color given by the posting image as a whole as the specific color component. In this case, representative color information indicates a specific color as a representative color of the posting image.

A case will be described as an example where only a red apple picture is enlarged and displayed as a posting image. When all items of pixel data configuring this posting image is RGB-converted, the RGB-converted pixel data has a R value much higher than G and B values. In this case, when the difference between the R value, and the G and B values is a threshold set in advance or more, the representative color information of the posting image is defined as R. In addition, information indicating a color obtained by averaging colors of pixels in a posting image may be used as representative color information. Further, information indicating a color which is the most frequently used in a posting image may be used as representative color information.

FIG. 5B is a view illustrating an example of content registered in the material image DB 142. As illustrated in FIG. 5B, in the material image DB 142, a material image ID, a material image, the number of divisions, the number of layers, a display order flag, point assigning layer information and a plurality of pieces of layer information are associated per material image and registered.

The material image ID is identification information of a material image. The material image is image data registered in a format such as JPEG, TIFF or PNG. The number of divisions indicates the number of divided areas of each layer configuring a material image. The number, the size and an arrangement of divided areas are common between layers. The number of layers indicates the number of layers configuring a material image.

The display order flag refers to information indicating whether or not a display order is set to each layer. When the display order is set to each layer, the display order flag is set to on. When the display order is not set to each layer, the display order flag is set to off. The display order indicates the order at which a mosaic image which imitates a layer image drawn in a layer is displayed in a time domain direction. When the display order flag is set to on, a mosaic image displayed on a web page is generated using only posting images allocated in an image area of a layer of a display order next to the first display order among layers for which allocation of posting images to all divided areas in the image area described below is completed. When the display order flag is set to off, a mosaic image displayed on a web page is generated using posting images allocated in image areas of all layers for which allocation of posting images to all divided areas in the image areas is completed.

The point assigning layer information indicates a layer (hereinafter, "point assigning layer") through which points are assigned to a user among layers configuring a material image. When a posting image is allocated to a divided area in an image area of the point assigning layer, points described below are assigned to the user who has posted the posting image. That is, the number of holding points of the user described below increases. In addition, for example, the point assigning layer maybe set in advance by an administrator or may be automatically set by the system control unit 15. Further, a plurality of point assigning layers may be set.

FIG. 5C is a view illustrating an example of content set to layer information. The layer information is information per layer. A number of pieces of layer information indicated by the number of layers are registered. As illustrated in FIG. 5C, in the layer information, a layer ID, a layer image, a display order, a Z order, representative color information, image area information, outline information, point assigning area information and color information of each divided area are set.

The layer ID is identification information of a layer.

The display order indicates the order at which a mosaic image which imitates a layer image set to a layer is displayed in the time domain direction. The display order is set when the display order flag is set to on. In addition, the display order is an example of order information according to the present invention.

The Z order indicates an order at which a layer is displayed in a Z axis direction. The Z axis direction is a direction in which layers are superimposed. In some cases, positions of divided areas to which posting images are allocated in each layer overlap between layers. In this case, when posting images allocated in each layer are superimposed, the system control unit 15 selects as a posting image for generating a mosaic image a posting image allocated in a layer indicating the earliest Z order among posting images allocated to the divided areas at the same position.

The layer image is an image drawn in a layer. The layer image is image data registered in a format such as JPEG, TIFF or PNG.

The representative color information indicates an impression of a color given by one layer image as a whole. Specific content of representative color information is the same as representative color information of a posting image. In addition, random information may be registered by an administrator of the information providing device 1 as representative information of a layer image.

The image area information indicates in units of divided areas an area in which a layer image is drawn. More specifically, the image area information is a list of divided areas in which layer images are drawn among divided areas configuring a layer. The entire divided areas including layer images are referred to as an "image area". The posting image is allocated to a divided area in the image area among divided areas configuring a layer. A range in which a layer image is not drawn in a layer is a range in which an image in the back of this layer is displayed. The image in the back of a given layer is a layer image drawn in a layer indicating an order subsequent to this layer. The entire layer is an image area in some cases, and part of a layer is an image area in some cases.

The outline information is a list of divided areas showing an outline in a layer image among divided areas configuring a layer. The divided area showing an outline includes, for example, an image showing an outline of, for example, a pattern, a figure or an object expressed in a layer image. A method of extracting an outline from an image includes, for example, recognizing a portion at which a color significantly changes as an outline. In addition, the method of extracting an outline is known, and therefore will not be described in detail.

The point assigning area information indicates a divided area (hereinafter, "point assigning area") through which points are assigned to a user among divided areas in an image area. When a posting image is allocated to a point assigning area, points are assigned to a user who has posted this posting image. In addition, for example, the point assigning area may be set in advance by an administrator or may be automatically set by the system control unit 15. Further, a plurality of point assigning areas may be set.

The color information of a divided area is information of a divided area calculated from this divided area. Specific content of color information is the same as color information of a posting image. Color information of a divided area is registered per divided area.

Material images and layer images may be registered in advance in the material image DB 142, or material images stored in an information recording medium such as a USB memory may be read through an interface unit which is not illustrated. Further, material images or layer images transmitted from the user terminal 2-*k* may be registered in the material image DB 142. When the user transmits a material image to the information providing device 1 by operating the user terminal 2-*k*, the user can browse a mosaic image which the user desires. In addition, when only a material image is transmitted from the user terminal 2-*k*, an administrator of the information providing device 1 generates a layer image based on a material image.

In addition, a material image itself is not used to generate a mosaic image. Hence, the material image may not be registered in the material image DB 142. Further, if there are image area information and color information of each divided area, it is possible to generate a mosaic image. Hence, the layer image may not be registered in the material image DB 142.

FIG. 5D is a view illustrating an example of content registered in the mosaic image DB 143. As illustrated in FIG. 5D, in the mosaic image DB 143, a mosaic image ID and table part data which is a mosaic image are associated per mosaic image and stored.

The mosaic image ID is identification information of a mosaic image.

The table part data is data in which display content of a mosaic image is described by a mark-up language. With the present embodiment, a mosaic image is expressed as a table in which a posting image is embedded in each cell. Each cell in the table corresponds to one divided area. A description language of table part data includes, for example, HTML (Hyper Text Markup Language), XML (Extensible Markup Language) and XHTML (Extensible HyperText Markup Language). In addition, in the following description, the HTML is used for the description language of table part data.

The table part data configures part of HTML document of a web page which displays a mosaic image. The user terminal 2-*k* displays a posting image in each cell in the table according to description content of table part data included in the HTML document to display a mosaic image in a web page.

For table part data, the table is defined by, for example, a table tag, a tr tag or a td tag. For example, a tag <a href="http://www.yyy.zzz/zzz.html"><img src="href="http://www.yyy.zzz/aaa.jpeg"></a> is set between a td start tag and a td end tag indicating a cell. Meanwhile, "http://www.yyy.zzz/aaa.jpeg" in an img tag is a URL (Uniform Resource Locator) of a posting image. Meanwhile, "http://www.yyy.zzz/zzz.html" in an a tag is a URL of information related to a posting image embedded in a cell (hereinafter, "posting image related information"). That is, an image link indicating a hyperlink to posting image related information by a posting image is set to a cell.

When the user performs an operation of selecting a posting image in a mosaic image in a web page which displays the mosaic image (that is, when the user selects an image link set to a cell), posting image related information is displayed in a web page. For example, the selected posting image is enlarged and displayed as posting image related information. Further, a profile (such as a name, a hometown and a hobby) of a user who has posted the selected posting image, and a URL (hereinafter, "profile URL") of a web page which displays a detailed profile are displayed as posting image related information.

Furthermore, the user information DB may be constructed in the memory unit 14. FIG. 5E is a view illustrating an example of content registered in the user information DB. As illustrated in FIG. 5E, information related to each user is registered in the user information DB. More specifically, in the user information DB, a user ID, a password, a name of a user, a date of birth, the sex, a hometown, a telephone number, an electronic mail address, the number of holding points, a hobby and a profile URL are stored per user.

The user ID is identification information of the user. The number of holding points refers to the total number of points which the user currently holds. The user can utilize points which the user holds, at, for example, a predetermined website. When, for example, a user purchases a product using, for example, a shopping site, the user can pay by points instead of paying money. In addition, the number of holding points is an example of point count information according to the present invention.

User information registered in the user information DB is, for example, information inputted by the user for user registration. In addition, in the user information DB, information of users who only browse mosaic images without posting images may not be registered.

The input/output interface unit 17 is a processing unit which performs interface processing between the communication unit 11, the display unit 12, the operation unit 13 and the memory unit 14, and the system control unit 15.

The system control unit 15 has, for example, a CPU (Central Processing Unit) 15a, a ROM (Read Only Memory) 15b and a RAM (Random Access Memory) 15c, and generates a mosaic image.

Hereinafter, a method of generating a mosaic image by the system control unit 15 will be described using the material image 30 showing the mobile telephone and the ribbon illustrated in FIG. 2A as an example. The image 31, the image 32 and the image 33 included in the material image 30 are separated into different layers. Further, the number of divisions of each layer is 986 in total including 34 in the vertical direction and 29 in the horizontal direction. Furthermore, the display order is set to each layer. That is, the display order flag is set to on.

Figure 6A:
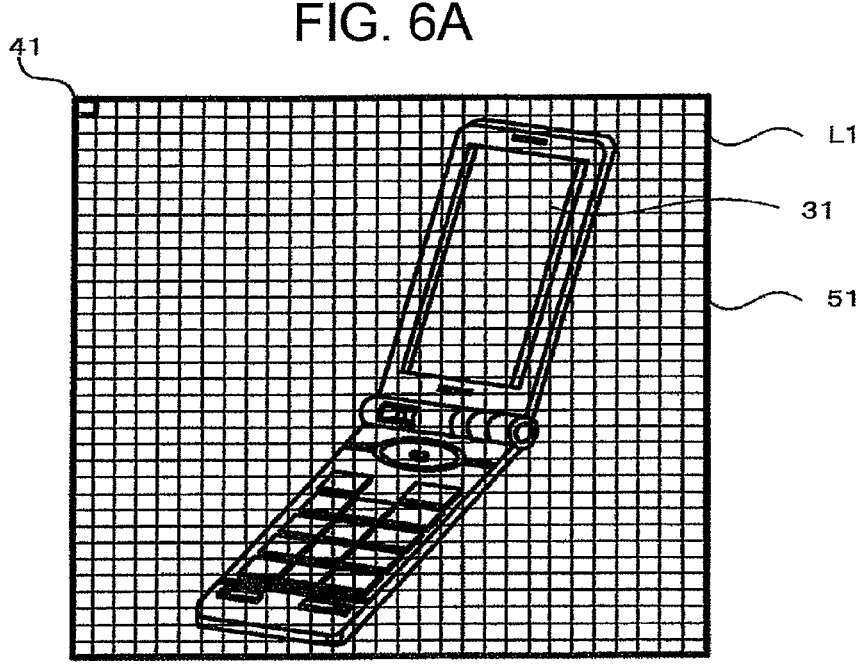
FIG. 6A illustrates an example of a layer L1.

FIG. 6A is an example of a layer L1. As illustrated in FIG. 6A, the layer L1 includes the mobile telephone image 31 as a layer image. Further, the layer L1 is divided into 986 divided areas 41. An image area 51 in the layer L1 is set to the entire layer L1. In the layer L1, a portion in which the mobile telephone image 31 is not drawn is a background. The display order of the layer L1 is set to the first. Further, the Z order of the layer L1 is set to the third. With the layer L1, the entire layer is an image area. Hence, when posting images allocated to the layers L1 to L3 are superimposed, the Z order of the layer L1 needs to be subsequent to the Z orders of the layers L2 and L3 to display a mosaic image which imitates the ribbon image 32 and a mosaic image which imitates the ribbon image 33.

Figure 6B:
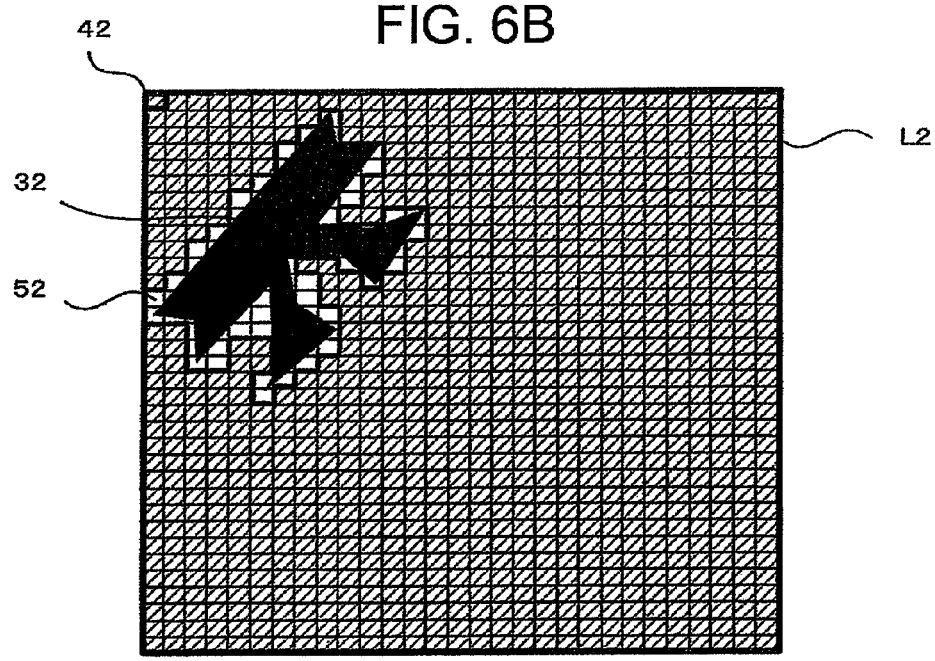
FIG. 6B illustrates an example of a layer L2.

FIG. 6B is an example of the layer L2. As illustrated in FIG. 6B, the layer L2 includes the ribbon image 32 as a layer image. Further, the layer L2 is divided into 986 divided areas 42. An image area 52 in the layer L2 is set to only divided areas including the ribbon image 32. The display order of the layer L2 is set to the second. Further, the Z order of the layer L2 is set to the first.

Figure 7:
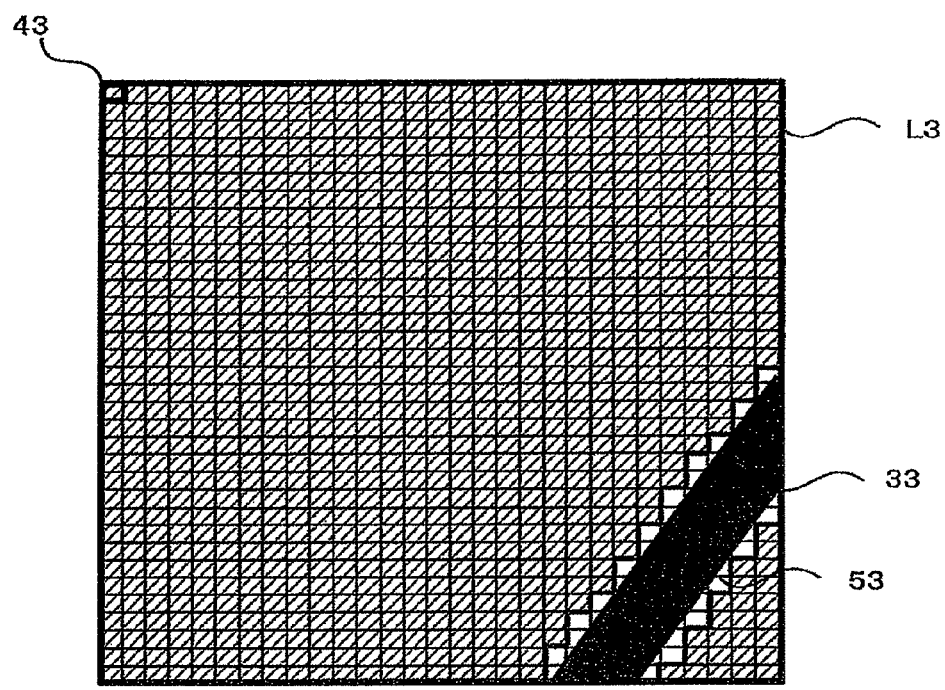
FIG. 7 illustrates an example of a layer L3.

FIG. 7 illustrates an example of the layer L3. As illustrated in FIG. 7, the layer L3 includes the ribbon image 33 as a layer image. Further, the layer L3 is divided into 986 divided areas 43. An image area 53 in the layer L3 is set to only divided areas including the ribbon image 33. The display order of the layer L3 is set to the third. Further, the Z order of the layer L3 is set to the second.

When receiving a posting image from the user terminal 2-k, the system control unit 15 allocates the received posting image to a divided area of a layer. More specifically, by acquiring image area information of each layer from the material image DB 142, the system control unit 15 specifies an image area of each layer. In addition, the system control unit 15 may analyze image data of a layer image and specify an image area.

Next, the system control unit 15 compares color information of the posting image and color information of the divided area in the image area of the layer. Further, when the color information of the posting image and the color information of the divided area approximate, this posting image is allocated to this divided area. For example, the system control unit 15 calculates each similarity between color information of a posting image and color information of each divided area in the image area of the layer. Further, the system control unit 15 decides that the approximation holds when the calculated similarity is a threshold set in advance or more. In this way, the system control unit 15 decides a divided area which is suitable to allocate a posting image. In addition, instead of using color information, the system control unit 15 may decide whether or not pieces of color information approximate using a representative color. The system control unit 15 can more easily allocate a posting image to a divided area by using representative color information than by using color information.

The system control unit 15 executes this allocation for each layer. Hence, while one posting image is not allocated to any layer in some cases, one posting image is allocated to a plurality of layers in some cases. The system control unit 15 allocates a posting image in the same manner every time a posting image is received from the user terminal 2-k. In proportion to an increase in the number of posts, a mosaic image of each layer (a mosaic image which imitates a layer image) comes closer to completion. Completion of a mosaic image of a given layer means that allocation of posting images in an image area of this layer is completed. That is, this means that posting images are allocated to all divided areas in the image area.

Figure 8A:
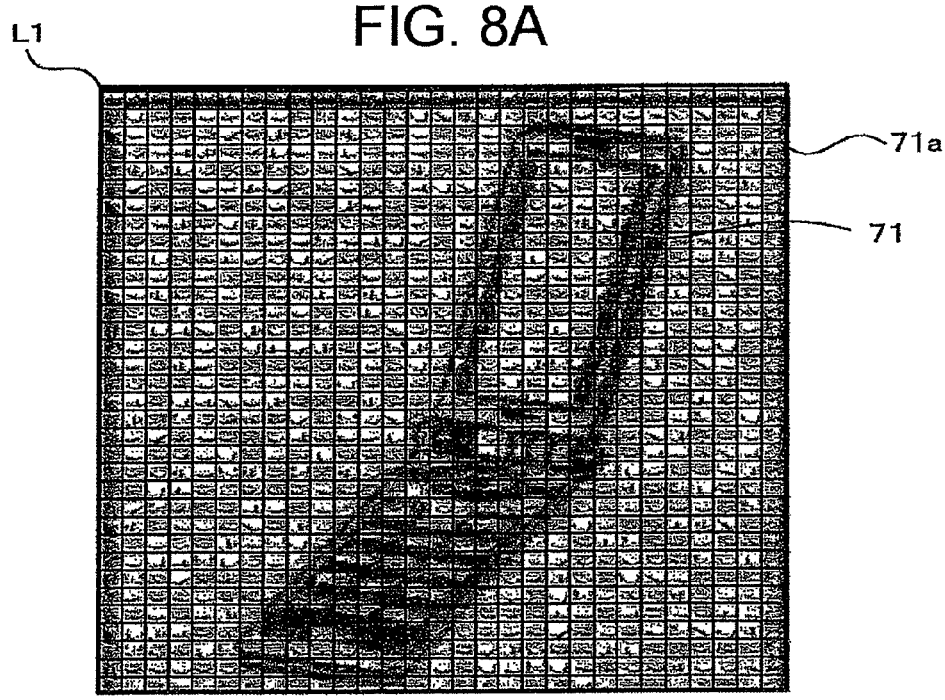
FIG. 8A illustrates an example of a mosaic image 71a of the layer L1.
Figure 8B:
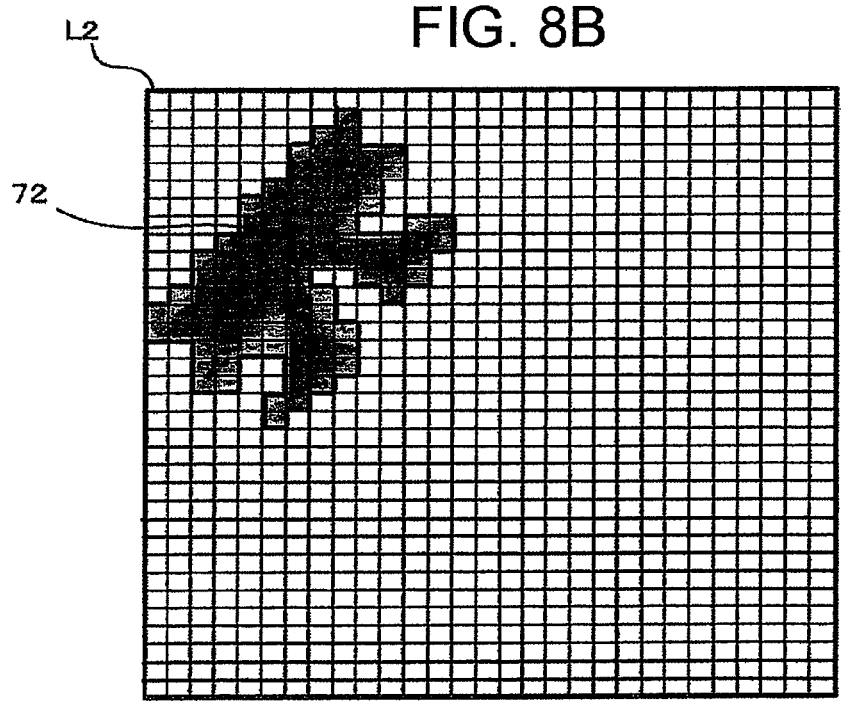
FIG. 8B illustrates an example of a mosaic image 72 of the layer L2.
Figure 9:
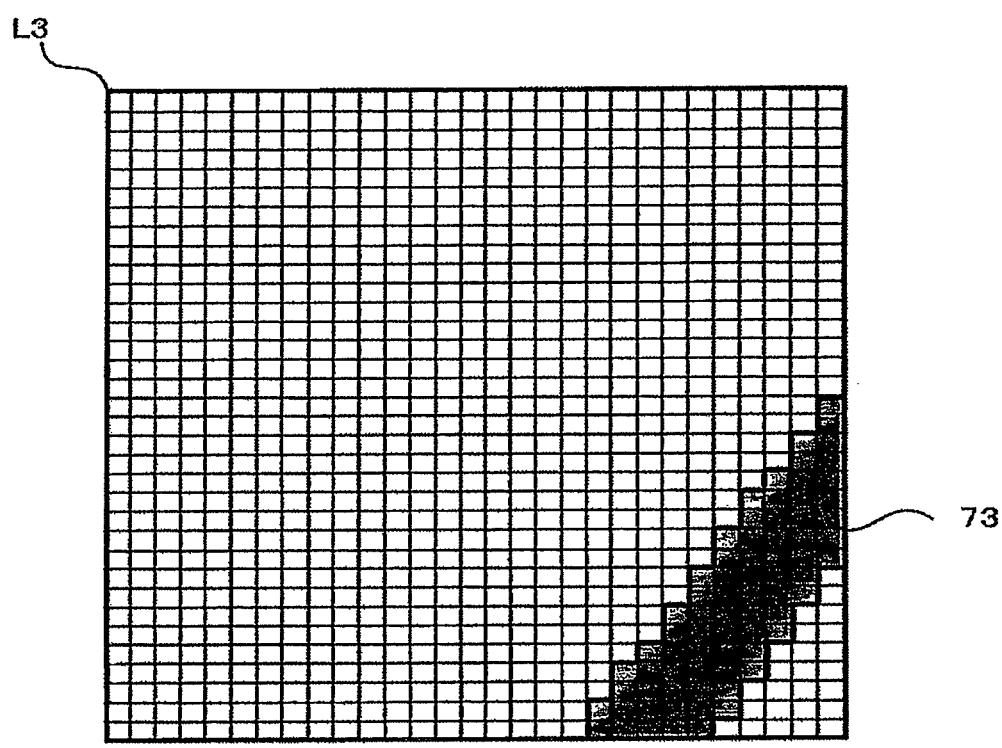
FIG. 9 illustrates an example of a mosaic image 73 of the layer L3.

With examples illustrated in FIGS. 6 and 7, the system control unit 15 finally completes a mosaic image as illustrated in FIGS. 8A, 8B and 9 by allocating posting images to the layers L1 to L3.

FIG. 8A illustrates an example of a mosaic image 71a of the layer L1. As illustrated in FIG. 8A, the mosaic image 71a of the layer L1 includes the mosaic image 71 which imitates the mobile telephone image 31. In the layer L1, posting images are allocated to the entire layer which is the image area of the layer L1.

FIG. 8B illustrates an example of the mosaic image 72 of the layer L2. As illustrated in FIG. 8B, the mosaic image 72 of the layer L2 is a mosaic image which imitates the ribbon image 32. In the layer L2, posting images are allocated to an area which is the image area of the layer L2 and in which the ribbon image 32 is drawn.

FIG. 9 illustrates an example of the mosaic image 73 of the layer L3. As illustrated in FIG. 9, the mosaic image 73 of the layer L3 is a mosaic image which imitates the ribbon image 33. In the layer L3, posting images are allocated to an area which is the image area of the layer L3 and in which the ribbon image 33 is drawn.

When allocation of posting images in an image area of one layer of all layers is completed, the system control unit 15 generates a mosaic image which a web page displays, using the posting images allocated to this layer. That is, the system control unit 15 generates a mosaic image of this layer.

Subsequently, every time the number of layers for which allocation of posting images in an image area is completed increases, the system control unit 15 regenerates a mosaic image. More specifically, the system control unit 15 generates a mosaic image by superimposing between layers posting images allocated to an image area of each layer for which allocation of posting images in the image area is completed.

Meanwhile, when a display order is set to each layer, the system control unit 15 generates a mosaic image using posting images allocated only to a layer of a display order next to the layer of the first display order among layers for which allocation of posting images in the image area is completed.

FIGS. 10A to 10C are views illustrating examples of a relationship between a state of allocated posing images in each layer and a generated mosaic image.

As illustrated in, for example, FIG. 10A, allocation of posting images in the image areas of the layers L1 and L3 is completed, and allocation for the layer L2 is completed. In this case, the display orders of the layer L1 and the layer L3 are not continuous. Hence, the system control unit 15 generates a mosaic image using only posting images allocated to the layer L1. That is, the system control unit 15 generates a mosaic image 70a including the mosaic image 71 which imitates the mobile telephone image 31.

Further, as illustrated in, for example, FIG. 10B, allocation of posting images in the image areas of the layer L1 and L2 is completed, and allocation for the layer L3 is not completed. In this case, the display orders of the layer L1 and the layer L2 are continuous. Hence, the system control unit 15 generates a mosaic image using posting images allocated to the layers L1 and L2. That is, the system control unit 15 generates a mosaic image 70b including the mosaic image 71 which imitates the mobile telephone image 31 and the mosaic image 72 which imitates the ribbon image 32.

Further, as illustrated in FIG. 10C, allocation of posting images in the image areas of the layers L1 to L3 is completed. In this case, the display orders of the layer L1 to the layer L3 are continuous. Hence, the system control unit 15 generates a mosaic image using posting images allocated to the layers L1 to L3, respectively. That is, the system control unit 15 generates the mosaic image 70 illustrated in FIG. 2B.

Figure 11A:
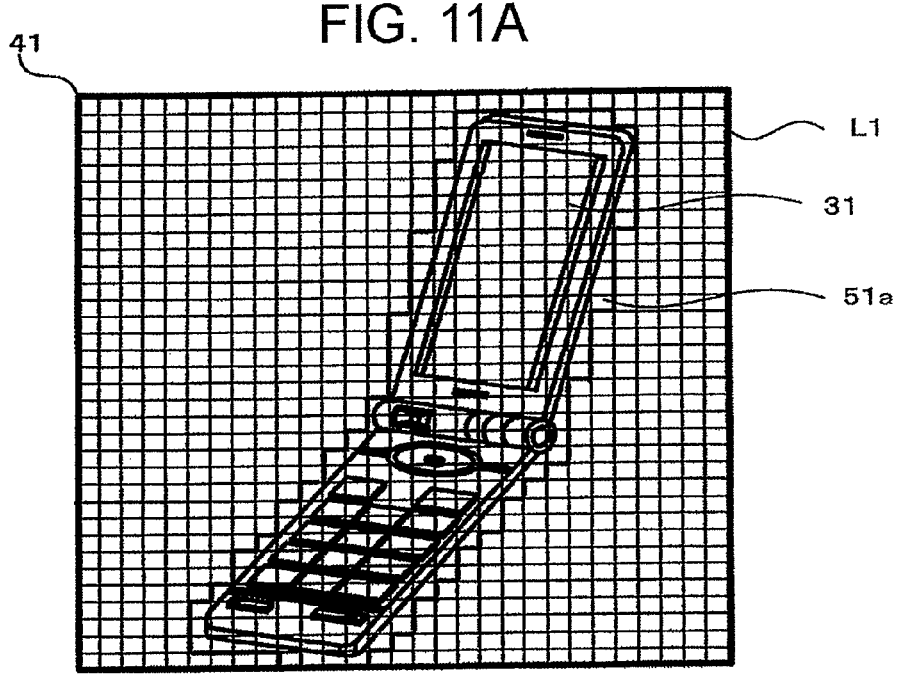
FIG. 11A illustrates an example of the layer L1.

In addition, an image area may be set only to a portion of the mobile telephone image 31 in the layer L1 instead of setting the image area to the entire layer. More specifically, as illustrated in FIG. 11A, an image area 51a is set.

Figure 11B:
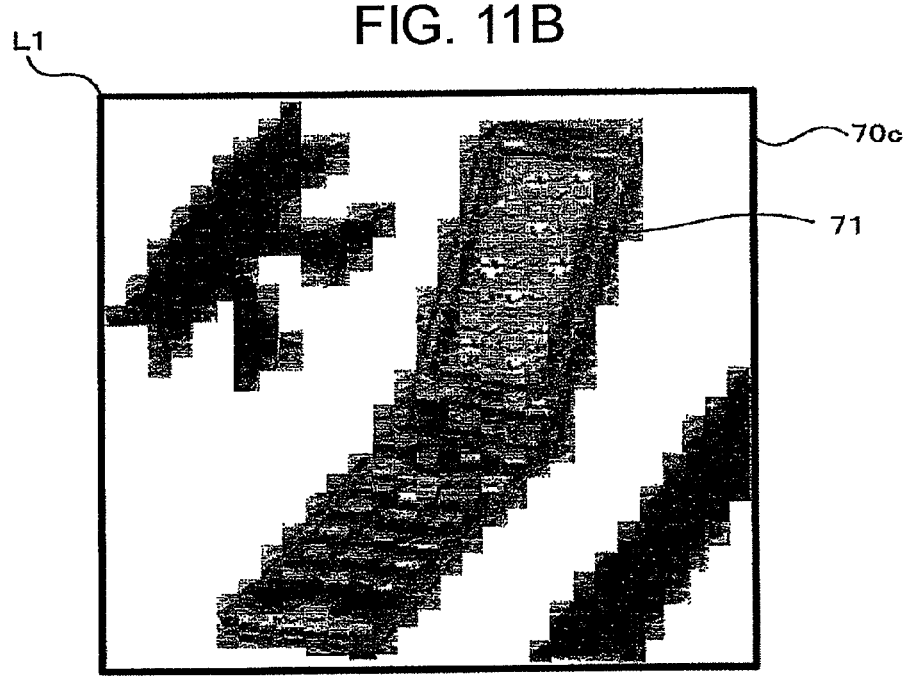
FIG. 11B illustrates an example of a mosaic image 71c of the layer L1.

In this case, when allocation of posting images in the image areas of the layers L1 to L3 is completed, a mosaic image 70c illustrated in FIG. 11B is generated. As illustrated in FIG. 11B, the mosaic image 70c includes the mosaic image 71, the mosaic image 72 and the mosaic image 73. The mosaic image 70c includes an image defect area. However, this area corresponds to a background portion in which nothing is shown in the material image 30. Further, a mosaic image which imitates a mobile telephone and a mosaic image which imitates a ribbon are displayed in a complete state. Consequently, it is possible to avoid giving an incomplete impression to users.

Figure 12A:
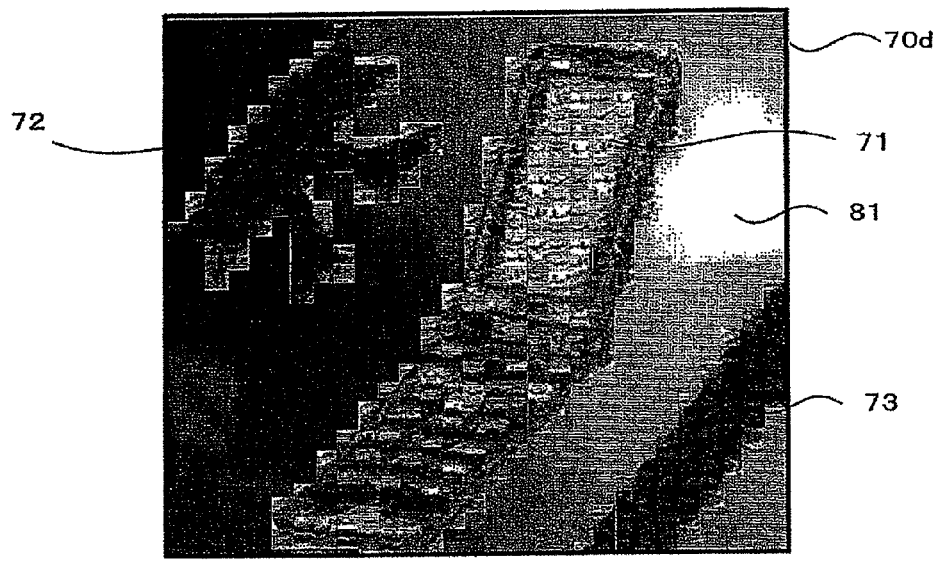
FIG. 12A illustrates a generation example of a mosaic image 70d including posting images as a background.

It is possible to fill an image defect area in the mosaic image 70c. For example, some posting images may be used as a background. FIG. 12A illustrates a generation example of a mosaic image 70d including posting images as the background. As illustrated in FIG. 12A, the mosaic image 70d includes the mosaic image 71, the mosaic image 72, the mosaic image 73 and posting images 81 as the background. In this case, a layer for the background may be provided. In this case, the number of divisions of the layer for the background is 1 for ease of description.

Figure 12B:
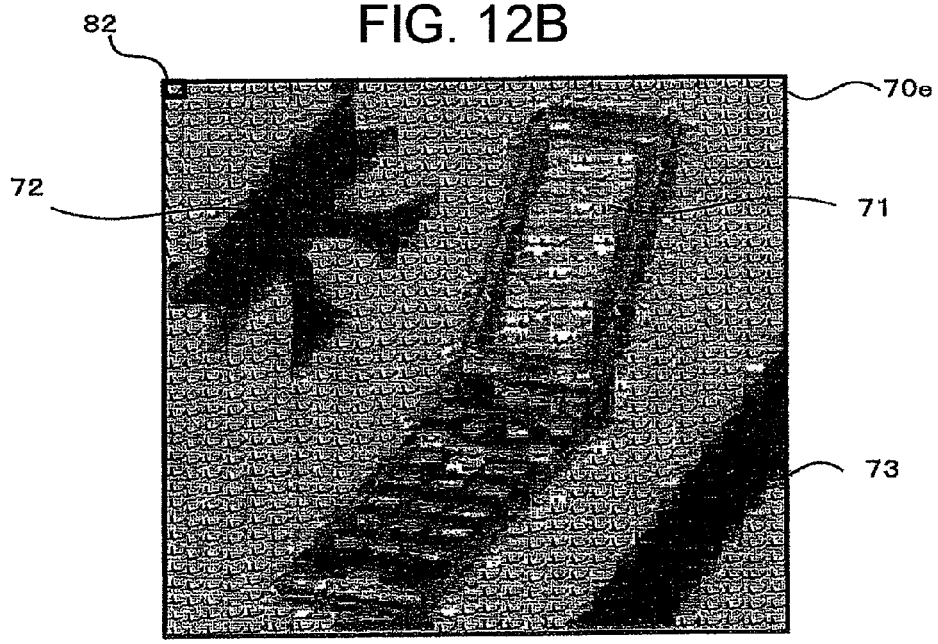
FIG. 12B illustrates a generation example of a mosaic image 70e in which a posting image is allocated to each divided area in a background portion.

Further, the system control unit 15 may allocate one posting image to each divided area of the background portion. FIG. 12B illustrates a generation example of a mosaic image 70e in which a posting image is allocated to each divided area of the background portion. As illustrated in FIG. 12B, the mosaic image 70e includes the mosaic image 71, the mosaic image 72 and the mosaic image 73. Further, with the mosaic image 70e, a posting image 82 is allocated to each divided area which is a background area. In addition, the system control unit 15 fills a plurality of posting images in divided areas instead of filling one posting image in each divided area which is a background.

Next, a case where a display order is not set to each layer, that is, a case where a display order flag is set to off, will be described.

Figure 13A:
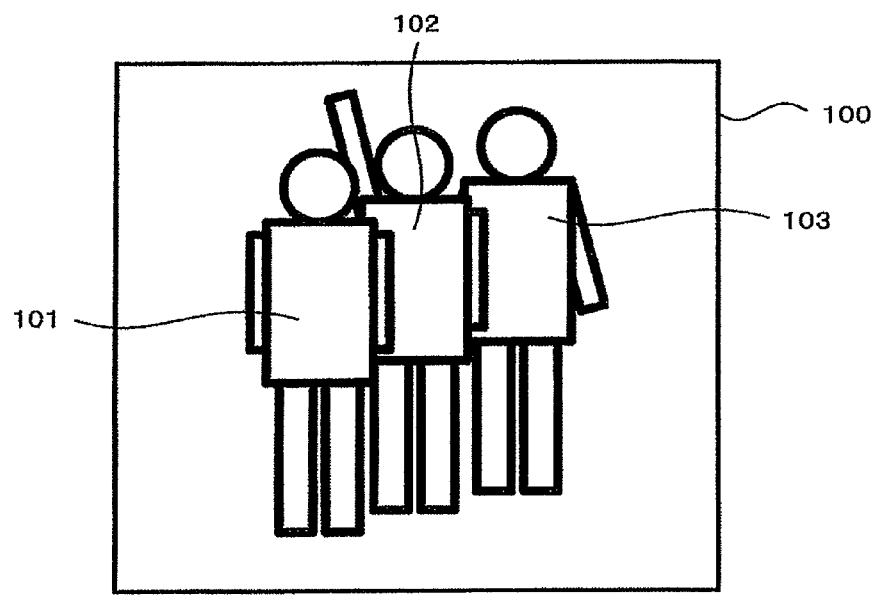
FIG. 13A illustrates a material image 100 showing three people.

FIG. 13A illustrates a material image 100 showing three people. As illustrated in FIG. 13A, the material image 100 includes a person image 101 on a left side, a person image 102 in the center and a person image 103 on a right side. The person in the center is positioned diagonally behind the person on the left on the material image 100, and part of the image 102 is hidden by the image 101. Further, the person on the right side is positioned diagonally behind the person in the center on the material image 100, and part of the image 103 is hidden by the image 102. The image 101, the image 102 and the image 103 are separated into different layers. Further, the number of divisions of each layer is 986 in total including 34 in the vertical direction and 29 in the horizontal direction.

Figure 13B:
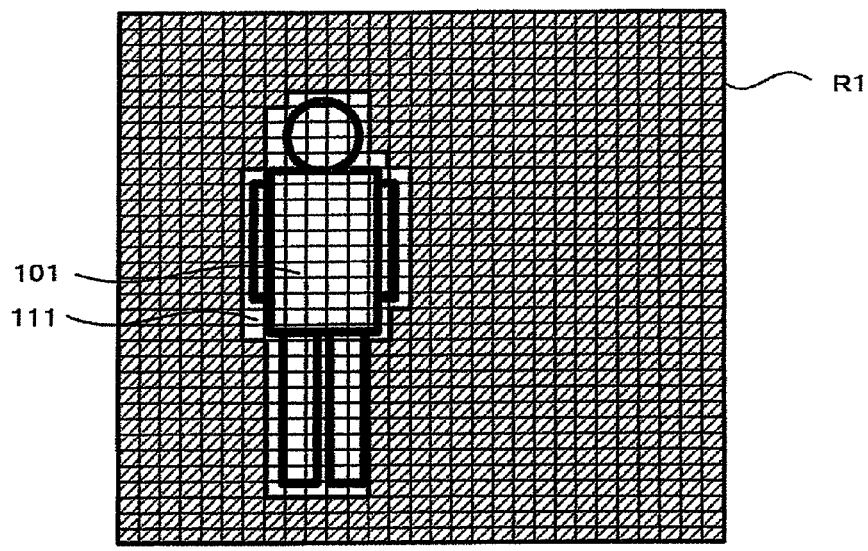
FIG. 13B illustrates an example of a layer R1.

FIG. 13B is an example of a layer R1. As illustrated in FIG. 13B, the layer R1 includes the person image 101 on the left side as a layer image. An image area 111 in the layer R1 is set to only divided areas including the image 101. The Z order of the layer R1 is set to the first.

Figure 14A:
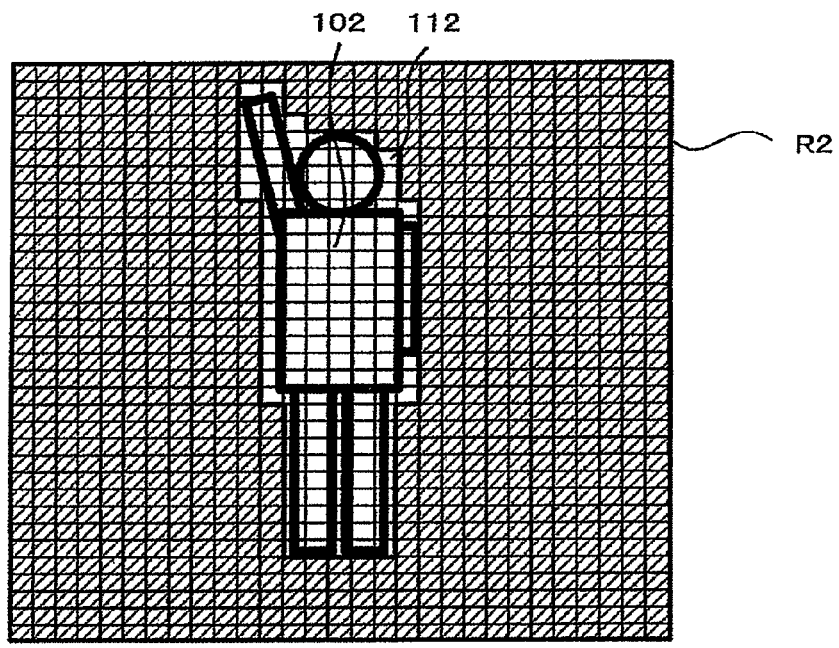
FIG. 14A illustrates an example of a layer R2.

FIG. 14A is an example of a layer R2. As illustrated in FIG. 14A, the layer R2 includes the person image 102 in the center as a layer image. Although part of the image 102 is hidden in the material image 100, the entire image 102 is seen in the layer R2. An image area 112 in the layer R2 is set to only divided areas including the image 102. The Z order of the layer R2 is set to the second.

Figure 14B:
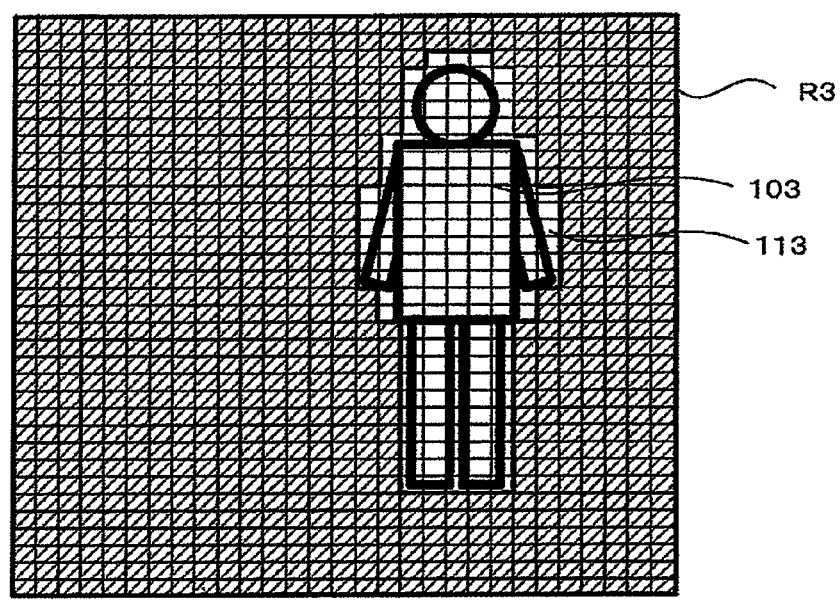
FIG. 14B illustrates an example of a layer R3.

FIG. 14B is an example of the layer R3. As illustrated in FIG. 14B, the layer R3 includes the person image 103 on the right side as a layer image. Although part of the image 103 is hidden in the material image 100, the entire image 103 is seen in the layer R3. An image area 113 in the layer R3 is set to only divided areas including the image 103. The Z order of the layer R3 is set to the third.

Irrespectively of a layer for which allocation of posting images in an image area is completed first in the material image 100, a mosaic image which a web page displays is generated using posting images allocated to this layer.

Figure 15A:
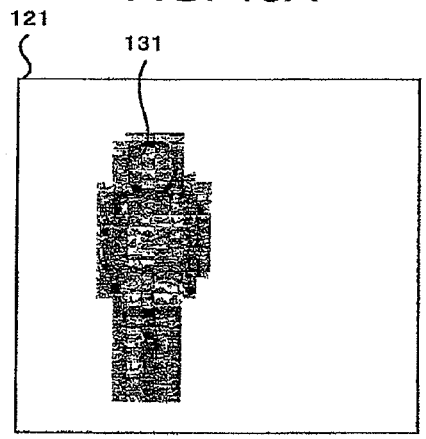
FIGS. 15 A to C illustrate examples of mosaic images generated when allocation of posting images in an image area of only one layer is completed.
FIGS. 15D to F illustrate examples of mosaic images generated when allocation of posting images in image areas of two layers is completed.
Figure 15D:
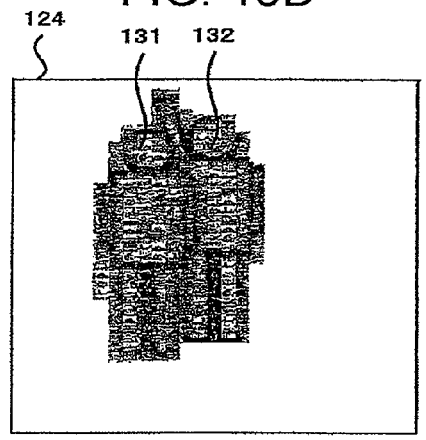
Figure 15B:
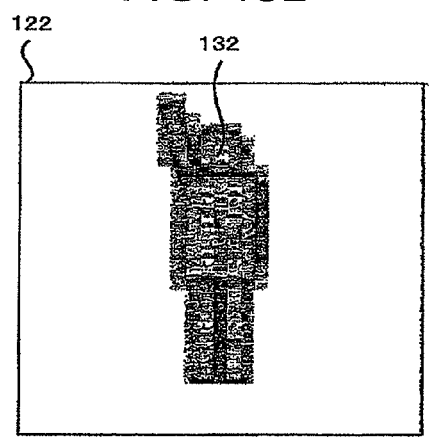
Figure 15E:
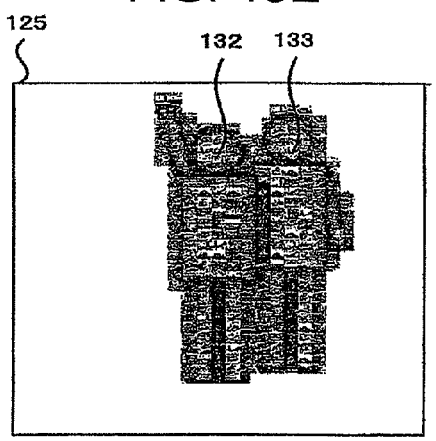
Figure 15C:
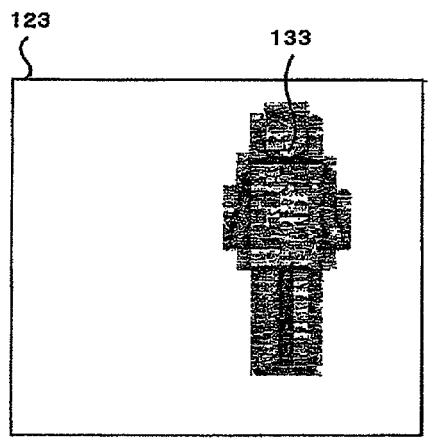

FIGS. 15A to 15C illustrate examples of mosaic images generated when allocation of posting images in an image area for only one layer is completed.

When, for example, allocation for only the layer R1 is completed, a mosaic image 121 is generated as illustrated in FIG. 15A. The mosaic image 121 includes a mosaic image 131 which imitates the person image 101 on the left side.

Further, when, for example, allocation for only the layer R2 is completed, a mosaic image 122 is generated as illustrated in FIG. 15B. The mosaic image 122 includes a mosaic image 132 which imitates the person image 102 in the center. The mosaic image 132 imitates a state where the entire person image 102 in the center is seen.

Further, when allocation for only the layer R3 is completed, a mosaic image 123 is generated as illustrated in FIG. 15C. The mosaic image 123 includes a mosaic image 133 which imitates the person image 103 on the right side. The mosaic image 133 imitates a state where the entire person image 103 on the right side is seen.

Subsequently, when the number of layers for which allocation of posting images in image areas is completed increases to two, a mosaic image is generated by superimposing posting images allocated to these two layers.

Figure 15F:
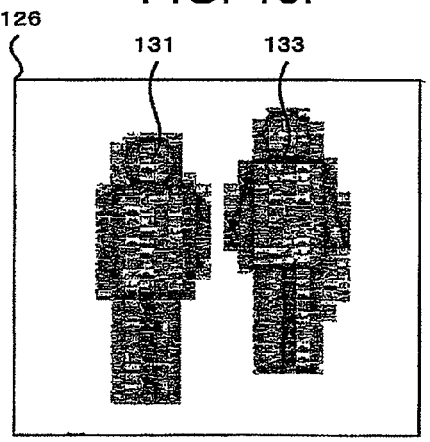

FIGS. 15D to 15F illustrate examples of mosaic images generated when allocation of posting images in image areas of two layers is completed.

When, for example, allocation for the layer R1 and the layer R2 is completed, a mosaic image 124 is generated as illustrated in FIG. 15D. The mosaic image 124 includes the mosaic image 131 which imitates the person image 101 on the left side, and the mosaic image 132 which imitates the person image 102 in the center. Further, part of the mosaic image 132 is hidden by the mosaic image 131 according to the Z orders of the layer R1 and the layer R2.

Further, when allocation for the layer R2 and the layer R3 is completed, a mosaic image 125 is generated as illustrated in FIG. 15E. The mosaic image 125 includes the mosaic image 132 which imitates the person image 102 in the center, and the mosaic image 133 which imitates the person image 103 on the right side. Further, part of the mosaic image 133 is hidden by the mosaic image 132 according to the Z orders of the layer R2 and the layer R3.

Furthermore, when allocation for the layer R1 and the layer R3 is completed, a mosaic image 126 is generated as illustrated in FIG. 15F. The mosaic image 126 includes the mosaic image 131 which imitates the person image 101 on the left side, and the mosaic image 133 which imitates the person image 103 on the right side.

Subsequently, when the number of layers for which allocation of posting images in image areas is completed increases to three, a mosaic image which imitates the material image 100 is generated by superimposing posting images allocated to these three layers. In this case, the generated mosaic image includes the mosaic image 131 which imitates the person image 101 on the left side, the mosaic image 132 which imitates the person image 102 in the center, and the mosaic image 133 which imitates the person image 103 on the right side.

In addition, the number of layers is 3 with the specific example described so far. However, the number of layers may be 2, or 4 or more. Further, the number of images included in one layer may be plural.

Next, a configuration and a function of the user terminal 2-$k$ will be described using FIG. 16.

FIG. 16 is a block diagram illustrating a schematic configuration example of the user terminal 2-$k$.

As illustrated in FIG. 16, the user terminal 2-$k$ has an operation unit 21, a display unit 22, a communication unit 23, a drive unit 24, a memory unit 25, an input/output interface unit 26 and a system control unit 27. Further, the system control unit 27 and the input/output interface unit 26 are connected through a system bus 28. For the user terminal 2-$k$, for example, a personal computer, a PDA (Personal Digital Assistant) or a mobile telephone is applied.

The operation unit 21 has, for example, a keyboard and a mouse.

The display unit 22 has a display for displaying, for example, web pages.

The communication unit 23 connects to the network NW to control a communication state with, for example, the information providing device 1. The drive unit 24 reads, for example, data from a disc DK (recording medium) such as a CD (Compact Disc) or a DVD (Digital Versatile Disc), and records, for example, data in the disc DK.

The memory unit 25 includes, for example, a hard disc drive, and stores, for example, an operating system (O/S) and a web browser program.

The system control unit 27 has, for example, a CPU 27$a$, a ROM 27$b$ and a RAM 27$c$. Further, the system control unit 27 executes the web browser program under execution of the operation system to display the mosaic image on the web browser.

Furthermore, the system control unit 27 transmits the posting images to the information providing device 1 through the communication unit 23. Still further, the system control unit 27 can associate information related to the posting images, with the posting images, and transmit the information.

Next, an operation of an information providing system matching a request of the user terminal 2-$k$ according to the present embodiment will be described using FIGS. 17 to 22.

FIG. 17 is a sequence diagram illustrating an operation of the information providing device 1 matching a request of the user terminal 2-$k$ according to the present embodiment.

As illustrated in FIG. 17, the given user terminal 2-$k$ such as a user terminal 2-1 selects an image posted by a user. Then, the user terminal 2-1 transmits the selected image as a posting image to the information providing device 1 (step S10). In this case, the user terminal 2-1 transmits a user ID of the user who has posted the image, to the information providing device 1.

Figure 18:
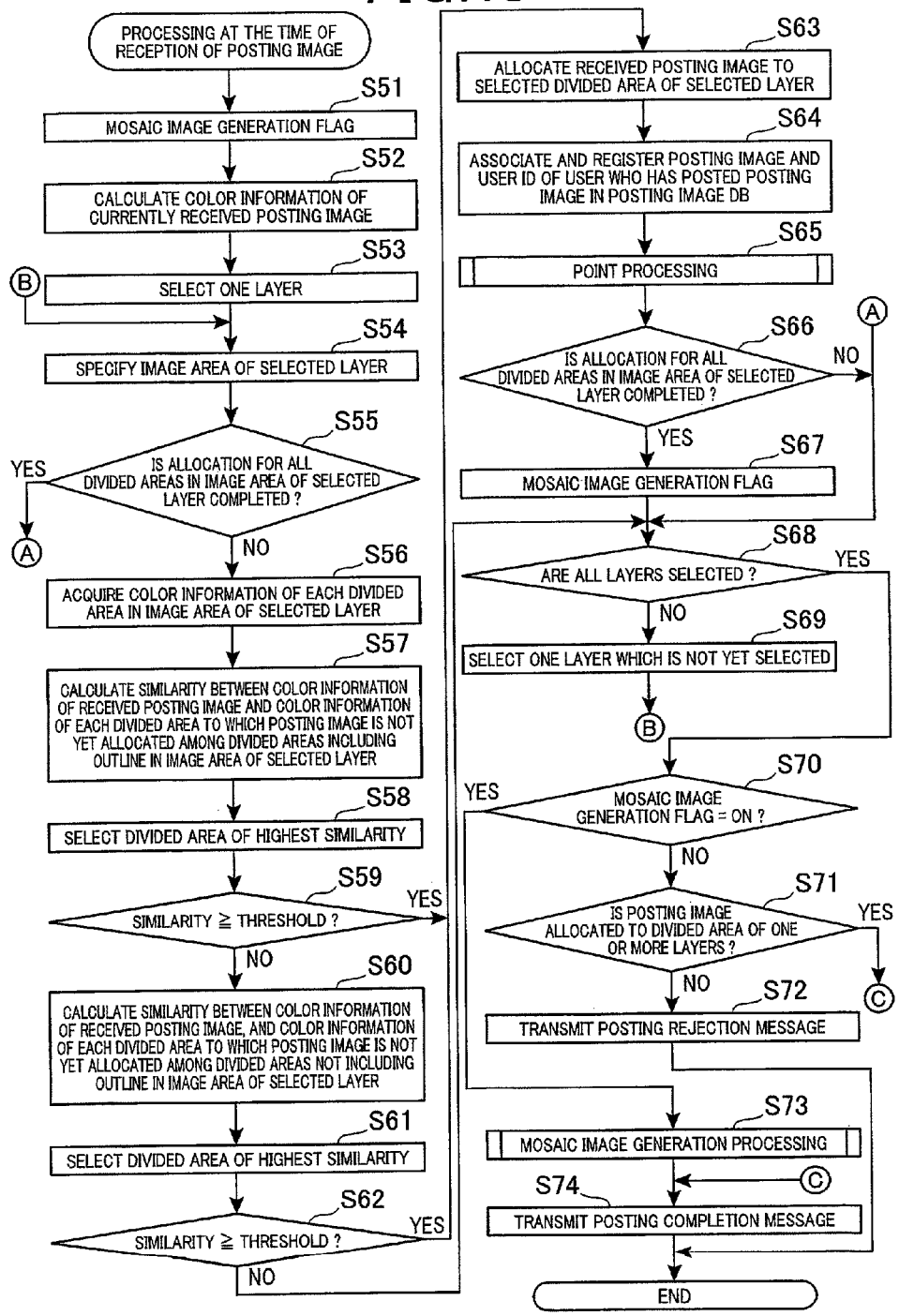
FIG. 18 is a view illustrating a processing example in processing of a system control unit 15 of the information providing device 1 according to an embodiment upon reception of a posting image.

FIG. 18 is a view illustrating a processing example in processing of the system control unit 15 of the information providing device 1 according to the present embodiment upon reception of a posting image. The processing upon reception of a posting image is started when the information processing device 1 receives a posting image and a user ID from the user terminal 2-$k$.

As illustrated in FIG. 18, the system control unit 15 sets a mosaic image generation flag to off (step S51). The mosaic image generation flag is information indicating whether or not to generate a mosaic image in response to the currently received posting image. Next, the system control unit 15 calculates color information of the currently received posting image (step S52).

Next, the system control unit 15 selects one layer among, for example, all layers of a material image selected in advance as a generation source of a mosaic image (step S53). Next, the system control unit 15 specifies the image area of the selected layer (step S54). More specifically, by acquiring image area information of the selected layer from the material image DB 142 and referring to image area information, the system control unit 15 specifies an image area.

Next, the system control unit 15 decides whether or not allocation to all divided areas in the image area of the selected layer is completed (step S55). In this case, when deciding that allocation to all divided areas in the image area of the selected layer is completed (step S55: YES), the system control unit 15 proceeds to step S68.

By contrast with this, when deciding that there are divided areas to which posting images are not allocated in the image area of the selected layer (step S55: NO), the system control unit 15 acquires color information of each divided area in the image area of the selected layer from the material image DB 142 (step S56).

Next, the system control unit 15 acquires outline information of the selected layer from the material image DB 142, and specifies divided areas including images showing an outline from divided areas in the image area of the selected layer based on the outline information. Further, the system control unit 15 calculates the similarity between color information of the currently received posting image and color information of each divided area to which a posting image is not yet allocated among divided areas including images showing the outline in the image area of the selected layer (step S57).

Next, the system control unit 15 selects a divided area of the calculated highest similarity (step S58). Next, the system control unit 15 decides whether or not the similarity calculated for the selected divided area is a threshold set in advance or more (step S59). In this case, when deciding that the similarity calculated for the selected divided area is a threshold or more (step S59: YES), the system control unit 15 allocates the currently received posting image to the selected divided area in the selected layer (step S63). For example, in the memory unit 14, allocation information indicating an allocation relationship between a divided area and a posting image is stored per layer. The system control unit 15 allocates a new posting image number to a currently received posting image. Further, the system control unit 15 associates and sets a new posting image number and a divided area number which is a selected divided area number, to allocation information.

By contrast with this, when deciding that the similarity calculated for the selected divided area is not a threshold or more (step S59: NO), the system control unit 15 calculates the similarity between color information of the currently received posting image and color information of each divided area to which a posting image is not yet allocated among divided areas including no image showing an outline in the image area of the selected layer (step S60).

Next, the system control unit 15 selects a divided area of the calculated highest similarity (step S61). Next, the system control unit 15 decides whether or not the similarity calculated for the selected divided area is a threshold set in advance or more (step S62). In this case, when deciding that the similarity calculated for the selected divided area is not a threshold or more (step S62: NO), the system control unit 15 proceeds to step S68.

By contrast with this, when deciding that the similarity calculated for the selected divided area is a threshold or more (step S62: YES), the system control unit 15 allocates the currently received posting image to the selected divided area in the selected layer (step S63). Thus, the system control unit 15 preferentially allocates a posting image to a divided area including an image showing an outline.

After finishing processing in step S63, the system control unit 15 registers the currently received posting image in the posting image DB 141 (step S64). More specifically, the system control unit 15 associates and registers a posting image number, a currently received posting image, a currently received user ID and color information of the currently received posting image.

Next, the system control unit 15 executes point processing described below (step S65). Next, the system control unit 15 decides whether or not posting images are allocated to all divided areas in the image area of the selected layer (step S66). In this case, when deciding that there are divided areas to which posting images are not allocated in the image area of the divided areas of the selected layer (step S66: NO), the system control unit 15 proceeds to step S68.

By contrast with this, when deciding that posting images are allocated to all divided areas of the selected layer (step S66: YES), the system control unit 15 sets a mosaic image generation flag to on (step S67), and proceeds to step S68.

In step S68, the system control unit 15 decides whether or not all layers of a material image which is a generation source of a mosaic image are selected. In this case, when deciding that there is a layer which is not yet selected (step S68: NO), the system control unit 15 selects one layer which is not yet selected (step S69) and proceeds to step S54.

By contrast with this, when deciding that all layers are selected (step S68: YES), the system control unit 15 decides whether or not the mosaic image generation flag is set to on (step S70). In this case, when deciding that the mosaic image generation flag is set to on (step S70: YES), the system control unit 15 executes mosaic image generation processing described below (step S74). Next, the system control unit 15 transmits a posting completion message to the user terminal 2-k which is a transmission source of a posting image (step S74), and finishes processing upon reception of a posting image. The posting completion message indicates that posting of a posting image is completed. The user terminal 2-k displays the received posting completion message on the display unit 22.

By contrast with this, when deciding that the mosaic image generation flag is not set to on (step S70: NO), the system control unit 15 decides whether or not the currently received posting image is allocated to a divided area of one or more layers (step S71). In this case, when deciding that the currently received posting image is not allocated to any divided area of a material image (step S71: NO), the system control unit 15 transmits the posting rejection message to the user terminal 2-k which is the transmission source of a posting image (step S72), and finishes processing upon reception of a posting image. The posting rejection message indicates that posting of a posting image is rejected. The user terminal 2-k displays the received posting rejection message on the display unit 22.

By contrast with this, when deciding that the currently received posting image is allocated to a divided area of one or more material image (step S71: YES), the system control unit 15 transmits a posting completion message to the user terminal 2-k which is the transmission source of the posting image (step S73), and finishes processing upon reception of the posting image.

In addition, when allocating the currently received posting image to a divided area, the system control unit 15 may allocate the currently received posting image to a divided area to which another posting image is already allocated. More specifically, the system control unit 15 calculates the similarity between color information of a given divided area and color information of a posting image which is already allocated to the divided area. Further, the system control unit 15 calculates the similarity between color information of the divided area and color information of the currently received posting image. Further, when the similarity to color information of the currently received posting image is higher than the similarity to color information of a posting image which is already allocated, the currently received posting image is allocated to this divided area. That is, the system control unit 15 allocates a posting image which is more suitable for the divided area than a posting image which is already allocated to the divided area. By this means, it is possible to generate a mosaic image which more faithfully imitates a material image. Further, in this case, the system control unit 15 may assign points to a user who has posted a newly allocated posting image instead of the posting image which is already allocated.

Figure 19:
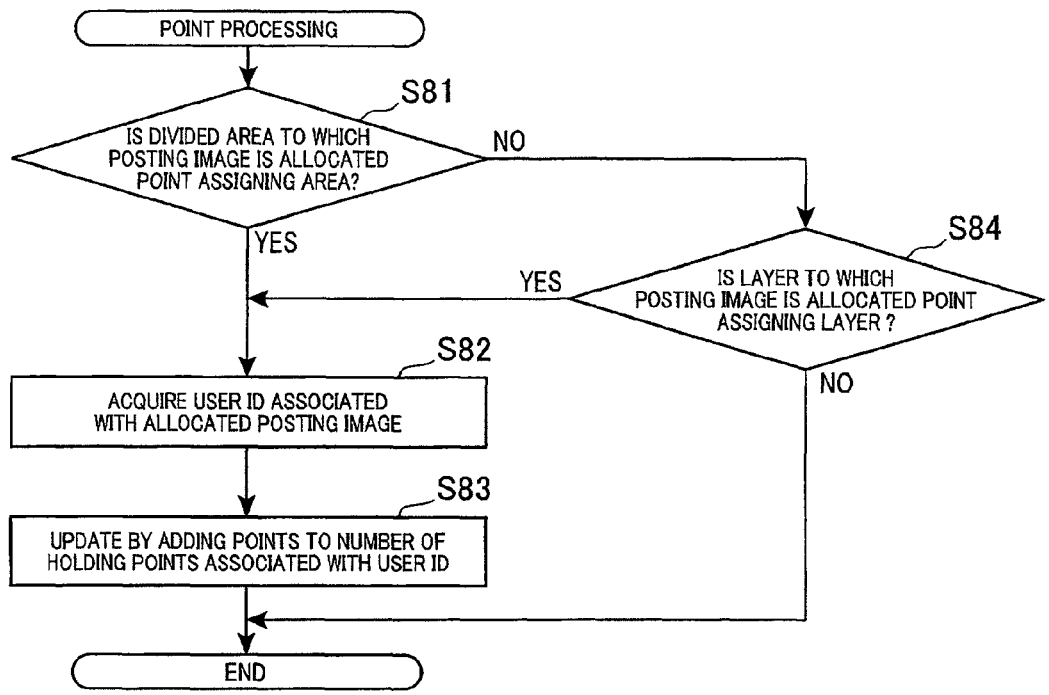
FIG. 19 is a view illustrating a processing example in point processing of the system control unit 15 of the information providing device 1 according to an embodiment.

FIG. 19 is a view illustrating a processing example in point processing of the system control unit 15 of the information providing device 1 according to the present embodiment.

As illustrated in FIG. 19, the system control unit 15 decides whether or not a divided area to which a posting image is allocated is a point assigning area, based on point assigning area information of the selected layer (step S81). In this case, when deciding that the divided area to which the posting image is allocated is a point assigning area (step S81: YES), the system control unit 15 assigns points to the user who has posted a posting image. First, the system control unit 15 acquires a user ID associated with the posting image allocated to this divided area, from the posting image DB 141 (step S82).

Next, the system control unit 15 updates the number of holding points associated with the acquired user ID (step S83). More specifically, the system control unit 15 acquires the number of holding points associated with the user ID from the user information DB. Next, the system control unit 15 updates the number of points by adding, for example, the number of points set in advance to the acquired number of holding points. Next, the system control unit 15 rewrites the number of holding points associated with the acquired user ID and stored in the user information DB, to the updated number of points. After finishing processing in step S83, the system control unit 15 finishes the point processing.

When deciding in step S81 that a divided area to which a posting image is allocated is not a point assigning area (step S81: NO), the system control unit 15 decides whether or not a layer to which the posting image is allocated is a point assigning layer (step S84). In this case, when deciding that the layer to which the posting image is allocated is a point assigning layer (step S84: YES), the system control unit 15 executes processings insteps S82 and S83. That is, the system control unit 15 assigns points to a user who has posted a posting image. By contrast with this, when deciding the layer to which the posting image is allocated is not a point assigning layer (step S84: NO), the system control unit 15 finishes point processing.

Figure 20:
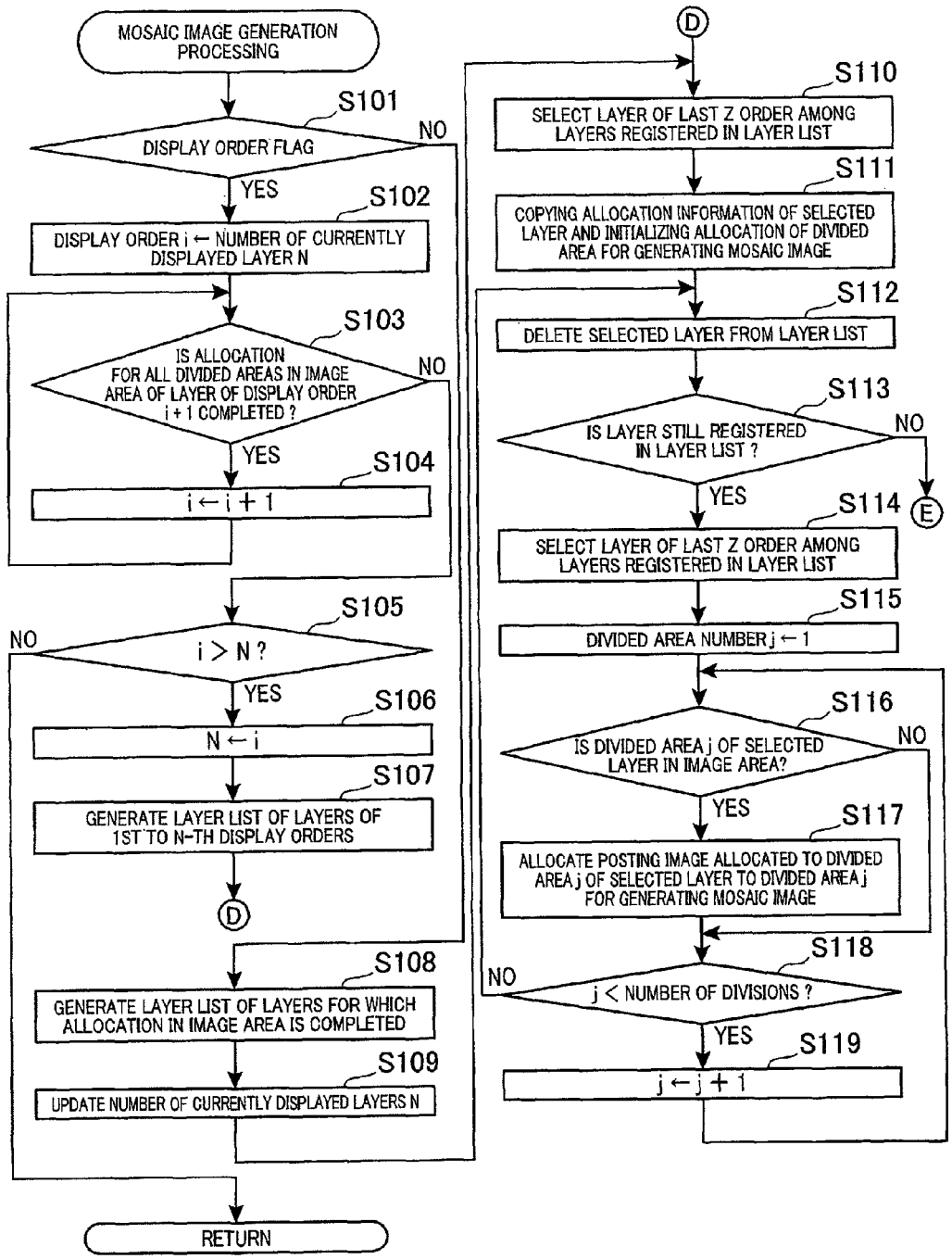
FIG. 20 is a view illustrating a processing example in mosaic image generation processing of the system control unit 15 of the information providing device 1 according to an embodiment.
Figure 21:
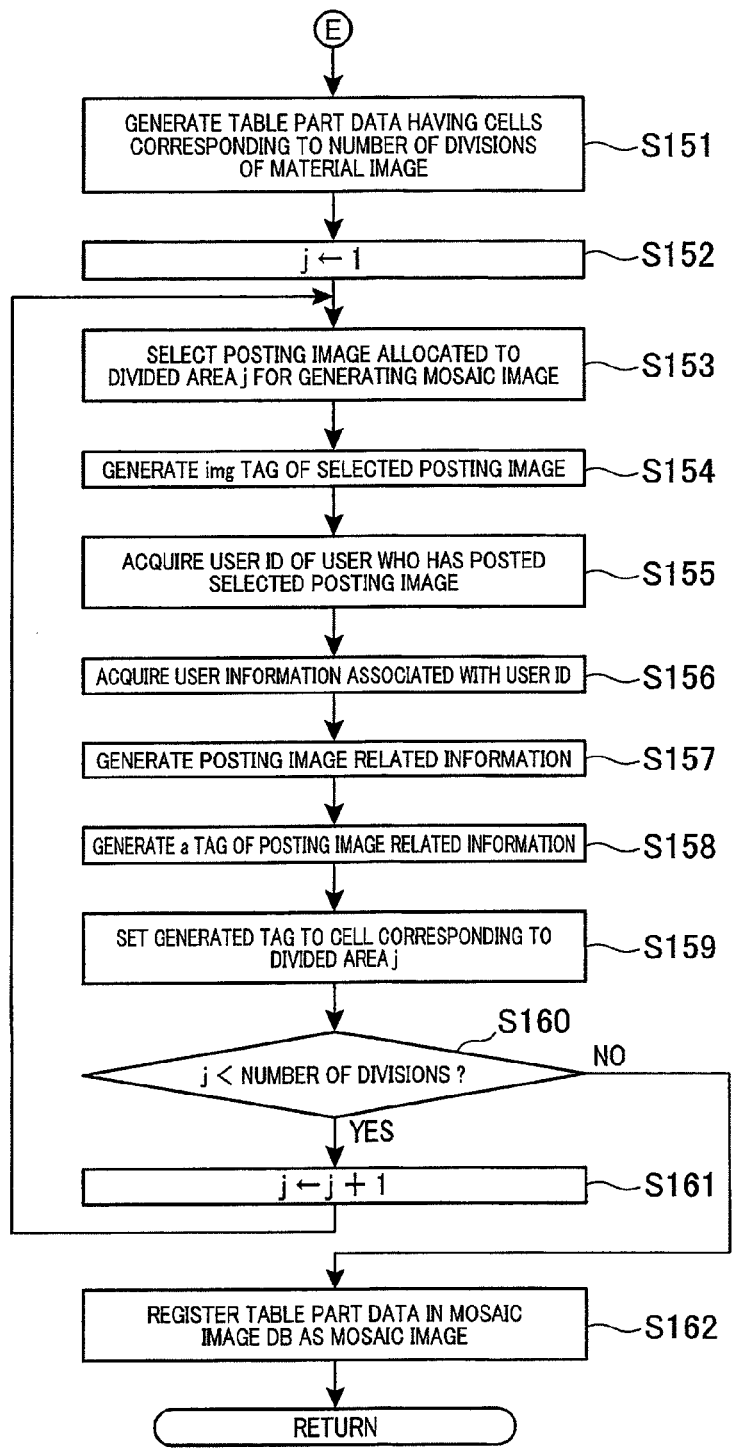
FIG. 21 is a view illustrating a processing example in mosaic image generation processing of the system control unit 15 of the information providing device 1 according to an embodiment.

FIGS. 20 and 21 are views illustrating processing examples in mosaic image generation processing of the system control unit 15 of the information providing device 1 according to the present embodiment.

As illustrated in FIG. 20, the system control unit 15 acquires a display order flag of a material image which is a generation source of a mosaic image, from the material image DB 142, and decides whether or not the acquired display order flag is set to on (step S101). In this case, when deciding that the display order flag is set to on (step S101: YES), the system control unit 15 specifies a layer of a display order next to the first display order.

First, the system control unit 15 sets the number of currently displayed layers N to a display order i (step S102). The number of currently displayed layers N is the number of layers which is currently used to generate a mosaic image displayed on a web page. At the point of time when the information providing device 1 receives the first posting image, the number of currently displayed layers N is set to O.

Further, the system control unit 15 acquires the display order of each layer of the material image which is a generation source of a mosaic image, from the material image DB 142.

Next, the system control unit 15 decides whether or not allocation of posting images to all divided areas in the image area of a layer of an i+1th display order is completed (step S103). In this case, when deciding that allocation of posting images to all divided areas is completed (step S103: YES), the system control unit 15 updates the display order i by adding 1 to the display order i (step S104). Next, the system control unit 15 proceeds to step S103.

By contrast with this, when deciding that there is a divided area to which a posting image is not allocated in the image area of the layer of the i+1th display order (step S103: NO), the system control unit 15 decides whether or not the display order i is greater than the number of currently displayed layers N (step S105). In this case, when deciding that the display order i is not greater than the number of currently displayed layers N (step S105: NO), the system control unit 15 finishes mosaic image generation processing.

The mosaic image generation processing is executed when the number of layers for which allocation of posting images to all divided areas in an image area is completed increases. However, allocation of posting images to the layer of the first display order is not completed in some cases. In this case, the display order i does not change from 0, and therefore a mosaic image is not generated. Further, in some cases, there is a layer for which allocation is not completed between a layer for which allocation of posting images is currently and newly completed and a layer of the first display order. In this case, the display order of the layer for which allocation is currently and newly completed does not continue from the layer of the first display order for which allocation is completed. In this case, the display order i does not become greater than the number of currently displayed layers N, and therefore a new mosaic image is not generated.

When deciding in step S105 that the display order i is greater than the number of currently displayed layers N (step S105: YES), the system control unit 15 sets the display order i to the number of currently displayed layers N (step S106). Next, the system control unit 15 generates a layer list listing layers from the first display order to the N-th display order as a list of layers used to generate a mosaic image (step S107). Next, the system control unit 15 proceeds to step S110.

When deciding in step S101 that the display order flag is not set to on (step S101: NO), the system control unit 15 generates a layer list listing all layers for which allocation of posting images to all divided areas in an image area is completed (step S108). Next, the system control unit 15 sets the number of listed layers to the number of currently displayed layers N (step S109), and proceeds to step S110.

When the layer list is generated, the system control unit 15 determines per divided area a posting image used to generate a mosaic image to be generated this time according to the Z order of each layer. That is, the system control unit 15 executes processing corresponding to superimposing of mosaic images between layers.

First, the system control unit 15 selects a layer of the last Z order among layers registered in the layer list (step S110). Next, the system control unit 15 sets allocation information for generating a mosaic image as default (step Sill). More specifically, the system control unit 15 copies allocation information of the selected layer from the memory unit 14 to the RAM 15c, and uses the copied allocation information on the RAM 15c as allocation information for generating a mosaic image.

Next, the system control unit 15 deletes the selected layer from the layer list (step S112). Next, the system control unit 15 decides whether or not a layer is still registered in the layer list (step S113). In this case, when deciding that a layer is still registered in the layer list (step S113: YES), the system control unit 15 selects the layer of the last Z order among the layers registered in the layer list (step S114).

Next, the system control unit 15 sets 1 to a divided area number j (step S115). Subsequently, a divided area of a divided area number j is referred to as a "divided area j". Next, the system control unit 15 decides whether or not the divided area j of the selected layer is a divided area in the image area of this layer, based on image area information of the selected layer (step S116). In this case, when deciding that the divided area j of the selected layer is not a divided area in the image area of this layer (step S116: NO), the system control unit 15 proceeds to step S118.

By contrast with this, when deciding that the divided area j of the selected layer is a divided area in the image area of this layer (step S116: YES), the system control unit 15 allocates a posting image allocated to the divided area j of the selected layer, to the divided area for generating a mosaic image (step S117). More specifically, the system control unit 15 acquires a posting image number associated with the divided area number j from the allocation information of the selected layer. Next, the system control unit 15 associates and sets the acquired posting image number and the divided area number j to allocation information for generating a mosaic image. After finishing processing in step S117, the system control unit 15 proceeds to step S118.

In step S118, the system control unit 15 decides whether or not the divided area number j is less than the number of divisions of a material image which is a generation source of a mosaic image. In this case, when deciding that the divided area number j is less than the number of divisions (step S118: YES), the system control unit 15 updates the divided area number j by adding 1 to the divided area number j (step S119). Next, the system control unit 15 proceeds to step S116.

By contrast with this, when deciding that the divided area number j is not less than the number of divisions (step S118: NO), the system control unit 15 proceeds to step S112.

When deciding in step S113 that all layers are deleted from the layer list (step S113: NO), the system control unit 15 generates a mosaic image.

As illustrated in FIG. 21, the system control unit 15 generates table part data of a table having a number of cells indicated by the number of divisions of a material image which is a generation source of a mosaic image (step S151). Next, the system control unit 15 sets 1 to the divided area number j (step S152).

Next, the system control unit 15 selects a posting image allocated to the divided area j based on allocation information for generating a mosaic image (step S153). Next, the system control unit 15 generates an img tag for in-line displaying the selected posting image in the table in the web page (step S154).

Next, the system control unit 15 acquires the user ID of the user who has posted the selected posting image, from the posting image DB 141 (step S155). Next, the system control unit 15 acquires user information associated with the acquired user ID, from the user information DB (step S156). Next, the system control unit 15 generates HTML document (hereinafter, "posting image related information part data") for displaying posting image related information, based on the acquired user information (step S157). Next, the system control unit 15 generates an a tag including a URL of the posting image related information (step S158).

In addition, the system control unit 15 may display not only posting image related information of a posting image finally allocated to generate a mosaic image, but also posting image related information of a posting image allocated to a divided area of each layer selected as a layer used to generate a mosaic image. More specifically, the system control unit 15 acquires a user ID of a user who has posted a posting image allocated to the divided area j of each layer selected as a layer used to generate a mosaic image, based on allocation information of each layer. Next, the system control unit 15 acquires user information associated with each acquired user ID. Further, the system control unit 15 generates posting image related information part data based on each acquired user information.

Next, the system control unit 15 sets the generated img tag and a tag to a cell corresponding to the divided area j among cells in the table part data generated in step S151 (step S159). Next, the system control unit 15 decides whether or not the divided area number j is less than a value indicated by the number of divisions of a material image which is a generation source of a mosaic image (step S160). In this case, when deciding that the divided area number j is less than a value indicated the number of divisions (step S160: YES), the system control unit 15 updates the divided area number j by adding 1 to the divided area number j (step S161). Next, the system control unit 15 proceeds to step S153.

By contrast with this, when deciding that the divided area number j is not less than a value indicated by the number of divisions (step S160: NO), the system control unit 15 registers table part data to which a tag is set, in the mosaic image DB as a mosaic image (step S162). After finishing processing in step S162, the system control unit 15 finishes mosaic image generation processing.

Back to description of FIG. 17, when the given user terminal 2-k such as a user terminal 2-2 activates a web browser and transmits a HTTP request from the system control unit 27 to the information providing device 1 (step S1), the system control unit 15 generates HTML document of a web page which displays the mosaic image according to this request (step S2) and distributes the HTML document of the web page to the user terminal 2-2 (step S3). In addition, the HTTP request transmitted in step S1 is referred to as a "mosaic image page request".

Figure 22:
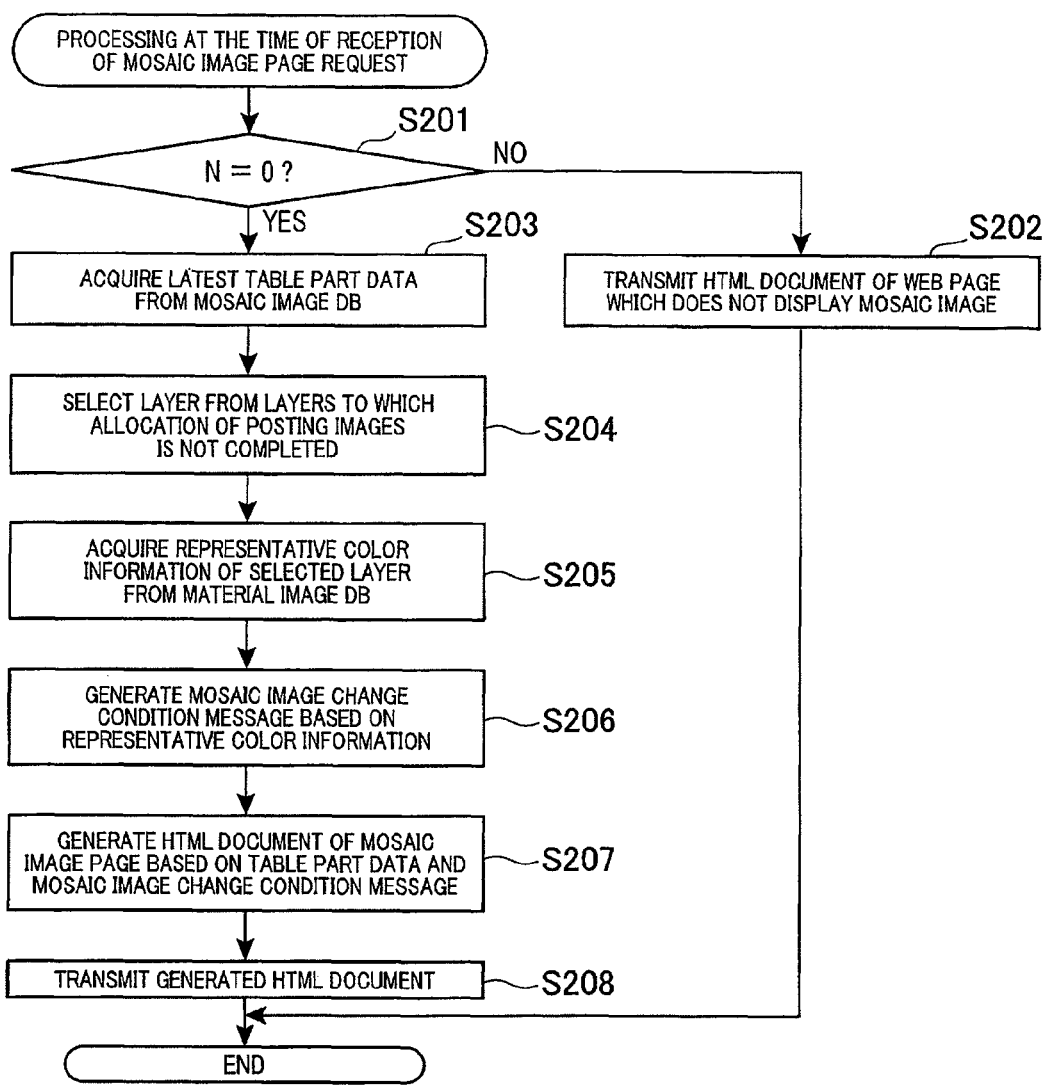
FIG. 22 is a view illustrating a processing example in processing of the system control unit 15 of the information providing device 1 according to an embodiment upon reception of a mosaic image page request.

FIG. 22 is a view illustrating a processing example in processing of the system control unit 15 of the information providing device 1 according to the present embodiment upon reception of a mosaic image page request. The processing upon reception of a mosaic image page request is started when the information providing device 1 receives the mosaic image page request from the user terminal 2-k.

As illustrated in FIG. 22, the system control unit 15 decides whether or not the number of currently displayed layers N is 0 (step S201). When the number of currently displayed layers N is 0, even one table part data is not generated as a mosaic image. Then, when deciding that the number of currently displayed layers N is 0 (step S201: YES), the system control unit 15 transmits HTML document of a web page which does not display a mosaic image to the user terminal 2-k which is the transmission source of the mosaic image page request (step S202), and finishes the processing upon reception of the mosaic image page request.

By contrast with this, when deciding that the number of currently displayed layers N is not 0 (step S201: NO), the system control unit 15 acquires the latest table part data from the mosaic image DB 143 (step S203). The latest table part data refers to table part data generated immediately before by mosaic image generation processing.

Next, the system control unit 15 selects a layer which is a display target of a mosaic image change condition message among layers which configure a material image which is a generation source of a mosaic image, and for which allocation of posting images to all divided areas in image areas is not completed (step S204). The mosaic image change condition message indicates a condition that a mosaic image displayed on a web page changes. The change of the mosaic image in this case means that a mosaic image changes in response to an increase in the number of portions imitating a layer image in the mosaic image. Hence, the condition that a mosaic image changes is required to complete allocation of posting images in an image area for each layer for which allocation of posting images to an image area is not completed.

When, for example, a display order flag of a material image is set to on, the system control unit 15 selects a layer of the N+1th display order. Current layers used to generate a mosaic image are layers of the first to N-th display orders. Therefore, it is necessary to complete allocation of posting images in an image area of a layer of the N+1th display order to change a mosaic image displayed on a web page.

Further, when, for example, the display order flag of the material image is set to off, the system control unit 15 selects a layer at random from layers for which allocation of posting images in an image area is not completed. In this case, the system control unit 15 may select a plurality of layers.

After finishing processing in step S204, the system control unit 15 acquires representative color information of the selected layer from the material image DB 142 (step S205).

Next, the system control unit 15 generates a text of a mosaic image change condition message based on the acquired representative color information (step S206). For example, the mosaic image change condition message shows "If you send more 0 images, a picture will change!!". Meanwhile, "o" represents a character indicating a representative color of a material image. The mosaic image change condition message is displayed in a web page which displays a mosaic image. For example, the selected layer is the layer L2 illustrated in FIG. 6B, and a representative color of the ribbon image 32 is red. In this case, the system control unit 15 generates a text of a message showing "If you send more red images, a picture will change!!".

In addition, when a plurality of layers are selected, the system control unit 15 may generate a text of a mosaic image change condition message based on each representative color information (for example, "If you send more red or yellow images, a picture will change!!").

Next, the system control unit 15 generates a web page which displays a mosaic image based on the table part data acquired from the mosaic image DB 143 and the generated text of the mosaic image change condition (step S207). Next, the system control unit 15 transmits the generated HTML document to the user terminal 2-k which is the transmission source of the mosaic image page request (step S208), and finishes processing upon reception of the mosaic image page request.

In addition, when a posting image is allocated to divided areas of a given layer, and this layer is selected as a layer which displays a mosaic image change condition message and has a representative color of the posting image matching a representative color of the allocating layer, the system control unit 15 may assign points to a user who has posted this posting image in point processing. For example, a representative color of the ribbon image 32 of the layer L2 illustrated in FIG. 6B is red. Further, the layer L2 is selected as a layer which displays a mosaic image change condition message, and a message showing "If you send more red images, a picture will change!!" is displayed in a web page. The user transmits an image including red as a representative color to the information providing device 1 from the user terminal 2-k as a posting image. When a received posting image is allocated to one divided area of the layer L2, the system control unit 15 assigns points.

Back to description of FIG. 17, the system control unit 27 of the user terminal 2-1 displays the web page which displays the mosaic image, in the window screen shown on the display of the display unit 22 based on the received HTML document (step S4).

Hereinafter, a mosaic image displayed on the display of the display unit 22 will be described using FIG. 23.

FIG. 23 is a view illustrating a mosaic image displayed on the display of the display unit 22.

As illustrated in FIG. 23, a web page 200 which displays a mosaic image displays an information display portion 201 which shows the content information, a posting image transmitting portion 202 for transmitting a posting image to the information providing device 1, a mosaic image 203 and a display image information display portion 204.

In addition, the posting image transmitting portion 202 is an interface used to transmit a posting image from the user terminal 2-k to the information providing device 1, and is realized by, for example, a CGI program installed in the information providing device 1.

Further, as the mosaic image 203 a mosaic image generated by the system control unit 15 is displayed. This mosaic image 203 is generated by being embedded with the posting image, and, in this posting image, a link for acquiring posting image related information is set. An example of display indicating that such a link is set may include that an outer frame of the posting image is highlighted (for example, the outer frame is displayed with a thick line) in the mosaic image 203. In addition, the display indicating that a link is set is by no means limited to this, and, for example, the outer frame may be displayed with a flash or may not be displayed at all.

In addition, FIG. 23 illustrates a display example where allocation of posting images in the image area of only the layer L1 is completed when a mosaic image is generated using the layers L1 to L3 illustrated in FIGS. 6 and 7. The mosaic image 71a including only the mosaic image 71 which imitates the mobile telephone 31 is displayed as the mosaic image 203.

The display image information display portion 204 displays a mosaic image change condition message. For example, a representative color of the ribbon image 32 of the layer L2 illustrated in FIG. 6B is red. In this case, the display image information display portion 204 displays a message showing "If you send more red images, a picture will change!!". When a user who has browsed the web page reads this message and posts a posting image including red as a representative color, the posting image is highly likely to be allocated in the image area of the layer L2 accordingly.

Back to description of FIG. 17, when the operation unit 21 of the user terminal 2-k performs an operation of selecting one posting image in the mosaic image 203 (this posting image is clicked) (step S5: YES), the system control unit 27 transmits a HTTP request to the information providing device 1 (step S6). This HTTP request requests distribution of a web page which displays the posting image related information, to a user terminal.

The system control unit 15 which receives this HTTP request acquires the web page which displays the posting image related information (step S7), and distributes the web page to the user terminal 2-k (step S8). More specifically, the system control unit 15 acquires posting image related information part data associated with a URL included in the HTTP request, from the memory unit 14. Next, the system control unit 15 generates HTML document including the latest table part data stored in the mosaic image DB 143 and the acquired posting image related information part data as HTML document of a web page which displays a mosaic image. Further, the system control unit 15 transmits the generated HTML document to the user terminal 2-*k*. A web page which displays posting image related information (more specifically, posting image related information part data) is an example of profile information according to the present invention.

In addition, when acquiring a posting image from the user terminal 2-*k*, the system control unit 15 may acquire information of a profile of a user who has posted an image, from the user terminal 2-*k*. That is, the system control unit 15 receives an input of the profile of the user when the user posts an image. In this case, the system control unit 15 generates posting image related information part data based on information of the received profile.

The system control unit 27 of the user terminal 2-*k* displays the web page 200 which displays the posting image related information, in the window screen shown on the display of the display unit 22 (step S9).

In addition, the system control unit 15 may transmit only posting image related information part data to the user terminal 2-*k*. In this case, the user terminal 2-*k* displays posting image related information in the currently displayed web page based on the received posting image related information part data.

FIG. 24 is a view illustrating a mosaic image shown on the display of the display unit 22.

As illustrated in FIG. 24, the web page 200 which displays a mosaic image displays a posting image related information display portion 205.

In the posting image related information display portion 205, the posting image related information is displayed on a so-called pop-up window.

More specifically, in the posting image related information display portion 205, for example, a name, a hometown, a hobby and a URL which is a hyperlink destination indicating a profile of a person shown by the posting image are displayed. In addition, information of a profile of a user may be, for example, information related to the user registered in the user information DB or information which introduces the user.

Subsequently, the number of posts increases by transmitting a posting image from each user terminal 2-*k* to the information providing device 1. By this means, in response to an increase in the number of layers for which allocation of posting images in image areas is completed, the system control unit 15 generates a new mosaic image by superimposing between layers posting images allocated to two layers.

Then, when the given user terminal 2-*k* such as the user terminal 2-2 transmits an image page request to the information providing device 1 (step S11), the system control unit 15 generates HTML document of a web page which displays a mosaic image by processing upon reception of the mosaic image page request (step S12), and distributes the generated HTML document to the user terminal 2-2 (step S13).

FIG. 25 is a view illustrating a mosaic image shown on the display of the display unit 22.

FIG. 25 illustrates a display example where allocation of posting images in the image areas of the layer L1 and the layer L2 is completed. Consequently, as the mosaic image 203 of the web page 200, the mosaic image 70*b* including the mosaic image 71 which imitates the mobile telephone 31 and the mosaic image 72 which imitates the ribbon image 32 is displayed.

In the layer L3 illustrated in FIG. 7, a representative color of the ribbon image 33 is green. In this case, the display image information display portion 204 displays a message showing "If you send more green images, a picture will change!!".

Meanwhile, the operation unit 21 of the user terminal 2-*k* performs an operation of selecting one posting image in the mosaic image 203, the posting image related information display portion 205 is displayed on the web page 200 similar to FIG. 24. When there is a posting image which is eventually hidden by the selected posting image as a result of superimposing posting images between layers in the mosaic image generation processing, the posting image related information display portion 205 displays, for example, not only posting image related information of the selected posting image, but also posting image related information of the hidden posting image. More specifically, the posting image related information display portion 205 displays, for example, a profile of each user who has posted a posting image allocated to a divided area corresponding to a position at which the selecting operation is performed in each layer used to generate a mosaic image.

Then, in response to a further increase in the number of layers for which allocation of posting images in image areas is completed, the system control unit 15 generates a new mosaic image by superimposing between layers posting images allocated to three layers.

FIG. 26 is a view illustrating a mosaic image shown on the display of the display unit 22.

FIG. 26 illustrates a display example where allocation of posting images in the image areas of the layers L1 to L3 is completed. Consequently, as the mosaic image 203 of the web page 200, the mosaic image 70 including the mosaic image 71 which imitates the mobile telephone 31, the mosaic image 72 which imitates the ribbon image 32 and the mosaic image 73 which imitates the ribbon image 33 is displayed.

In addition, even when, for example, a period (for example, the time or days) set in advance passes after the first posting image is received and registered in the posting image DB 141, there is not even one layer for which allocation of posting images in an image area is completed, the system control unit 15 generates a mosaic image using a posting image allocated to one layer. In this case, a web page displays an incomplete mosaic image.

Meanwhile, when a display order is set to each layer and a period set in advance passes, if allocation of posting images in image areas of a layer of the first display order is not completed, the system control unit 15 generates a mosaic image using posting images allocated in the image area of the layer of the first display order.

By contrast with this, when a display order is set to each layer, the system control unit 15 may select at random a layer used to generate a mosaic image. Further, the system control unit 15 may select, for example, a material image of the calculated highest completion rate of the mosaic image. The completion rate of the mosaic image is found by, for example, dividing the number of divided areas to which posting images are allocated, by the number of divided areas included in an image area.

When an incomplete mosaic image is displayed on a web page, there are various conditions of displaying a mosaic image change condition message on the web page. When, for example, posting images which correspond to a number of images set in advance or more and which cannot be allocated to a layer used to generate a mosaic image are transmitted, the system control unit 15 may display a mosaic image change condition message. Further, when an incomplete mosaic image is completed or the completion rate of the incomplete mosaic image is the completion rate set in advance or more, the system control unit 15 may display a mosaic image change condition message. Furthermore, when a period set in advance passes after the first posting image is received and registered in the posting image DB 141, the system control unit 15 may display a mosaic image change condition message.

In addition, even when a period passes after the first posting image is received and registered in the posting image DB 141 while an incomplete mosaic image is displayed on a web page, if the incomplete mosaic image is not completed, the system control unit 15 may use as point assigning areas all divided areas to which posting images are not yet allocated among divided areas in the image area of a layer used to generate a mosaic image. That is, when the posting images allocated to incomplete portions (cells) in a mosaic image displayed on a web page are posted, the system control unit 15 may assign points.

In addition, the system control unit 15 preferentially allocates posting images to divided areas including images showing an outline by processing upon reception of a posting image. Consequently, the user can learn the material image imitated by the incomplete mosaic image at a comparatively early stage.

Subsequently, when receiving a posting image from the user terminal 2-$k$ and allocating the received posting image to a layer used to generate a mosaic image, the system control unit 15 updates a mosaic image using a newly allocated posting image. By this means, a mosaic image displayed on a web page is gradually completed.

Further, when allocation of posting images in an image area of a layer used to generate a mosaic image, a mosaic image of this layer is completed. In this case, when there are other layers for which allocation of posting images in image areas is completed, the system control unit 15 generates a mosaic image by superimposing posting images allocated to a plurality of layers for which allocation of posting images is completed. Meanwhile, when a display order is set to each layer, the system control unit 15 generates a mosaic image using only a layer of a display order next to the layer of the first display order among layers for which allocation of posting images in the image area is completed.

As described above, according to the present embodiment, the system control unit 15 acquires a posting image from the user terminal 2-$k$ through the network, specifies in units of divided areas an image area in which an image is drawn in each layer of a plurality of layers which configure a material image which is a source of a mosaic image, and which are divided into a plurality of divided areas, and allocates the acquired posting image to a divided area in the image area of one layer based on color information of the acquired posting image and color information of each divided area in the specified image area. Further, the system control unit 15 generates a mosaic image by superimposing between layers posting images allocated in image areas of two or more layers in which posting images are allocated to all divided areas in the image areas among a plurality of layers configuring a material image. More specifically, the system control unit 15 generates a mosaic image configured with posting images allocated in an image area of one layer when allocation of posting images in the image area of the layer is completed, and, after the mosaic image is generated, generates a mosaic image by superimposing between layers posting images allocated in an image area of each layer for which allocation of posting images in the image area is completed when the number of layers for which allocation of images in image areas increases in proportion to an increase in the number of posts.

Consequently, it is possible to generate a mosaic image without image defect portions as a mosaic image which imitates an image configuring a material image, and generate the mosaic image as a more perfect mosaic image which imitates a material image. Further, it is possible to generate a mosaic image as a perfect mosaic image which imitates an image configuring a material image, and generate the mosaic image as a perfect mosaic image which imitates a material image. Consequently, it is possible to generate a mosaic image which is suitable for users to see even when sufficient images are not acquired to complete the mosaic image which imitates the material image.

Further, the system control unit 15 acquires a display order of each layer from the material image DB 142 and generates a mosaic image configured with posting images allocated in an image area of a layer when allocation of posting images in an image area of the layer of the first display order among a plurality of layers is completed, and, after the mosaic image is generated, generates a mosaic image by superimposing between layers posting images allocated in the image area of the layer of a display order next to the first display order among layers for which allocation of posting images in the image areas is completed in response to an increase in the number of posts.

Consequently, it is possible to increase the number of images imitated by the mosaic image according to an order set based on an intention of a user who provides the mosaic image.

Further, the system control unit 15 decides whether or not there is a divided area which is suitable to allocate an acquired posting image based on color information of the acquired posting image and color information of each divided area, and the posting image DB 141 does not use the acquired posting image to generate a mosaic image when deciding that there is no divided area which is suitable to allocate the acquired posting image.

When the posting image acquired from the user device 2-$k$ is not suitable for any divided area, this image is not used to generate a mosaic image. Consequently, it is possible to generate a mosaic image which more faithfully imitates a material image, so that it is possible to encourage user's motivation of continuously browsing a mosaic image.

Further, the system control unit 15 acquires a posting image and a user ID of a user who has posted the posting image from the user terminal 2-$k$, and updates the number of holding points by adding the number of points of an assigning target to the number of holding points stored in the user information DB when the posting image acquired from the user terminal 2-$k$ is allocated in an image area of a point assigning layer.

Consequently, when a posting image is allocated to the point assigning layer, points are assigned to the user who has posted the image. By this means, it is possible to encourage user's motivation of posting images. Consequently, the resolution of a mosaic image and a material image imitated by the mosaic image are expected to change quickly, so that it is possible to encourage user's motivation of continuously browsing the mosaic image.

Further, the system control unit 15 acquires a posting image posted by the user, from the user terminal 2-$k$, transmits HTML document for displaying the generated mosaic image to the user terminal 2-$k$, receives a HTTP request transmitted from the user terminal 2-$k$ when the user selects a posting image included in the mosaic image displayed by the user terminal 2-k based on the HTML document, and transmits posting image related information part data including a profile of a user matching a URL of the received HTTP request, to the user terminal 2-k which is the transmission source of the HTTP request.

Consequently, users who browse a mosaic image can browse a profile of a user who has posted a posting image included in the displayed mosaic image. Consequently, it is possible to encourage user's motivation of browsing a mosaic image.

Further, the system control unit 15 displays a condition that a mosaic image to be displayed changes.

Consequently, it is possible to give an expectation to users that a mosaic image to be displayed is likely to change based on posting images transmitted by the users, so that it is possible to encourage users' motivation of repeatedly and continuously browsing a mosaic image, and provide an effect of attracting guests.

[Second Embodiment]

With the first embodiment, the information providing device 1 generates a mosaic image using posting images allocated in an image area of a layer under a condition that posting images are allocated to all divided areas in the image area. However, even when posting images are not allocated to part of divided areas in the image area, if posting images are allocated to divided areas of another layer having a display position which overlaps the divided areas, it is possible to compensate for an image defect portion. Hence, with the second embodiment, under a condition that a posting image is allocated to at least one divided area among divided areas having a overlapping display position between layers among all divided areas in image areas of two or more layers, the information providing device 1 generates a mosaic image by superimposing posting images allocated to two or more layers. Hereinafter, divided areas having overlapping display positions between layers refer to divided areas in which at least part of areas overlap between layers when layers are superimposed. When the number, the size and an arrangement of divided areas of each layer are the same, divided areas of different display positions between layers mean divided areas of the same display positions.

Figure 27A:
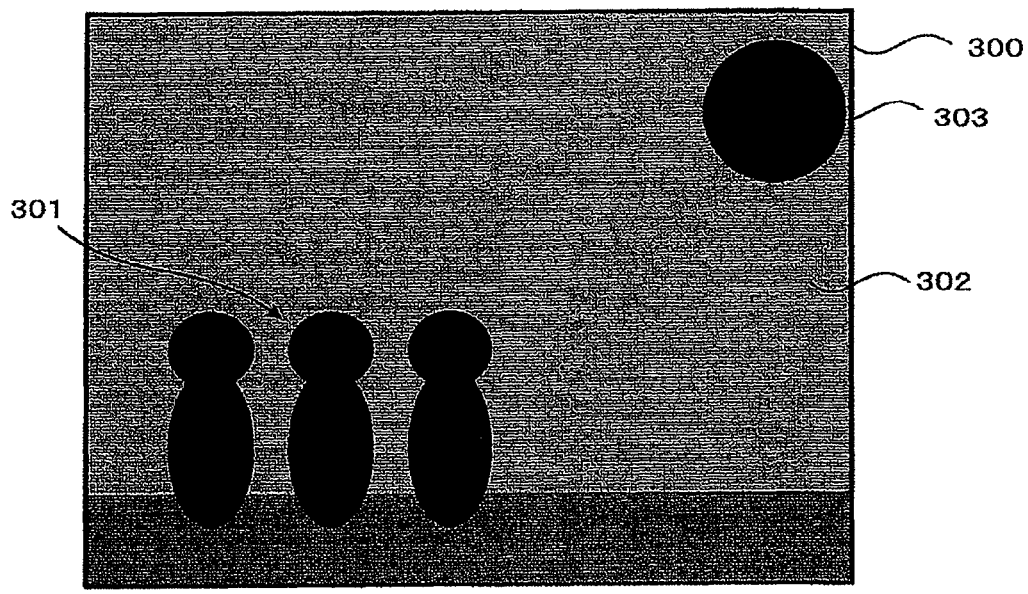
FIG. 27A illustrates a material image 300 showing a certain landscape.

A specific example will be described below. FIG. 27A illustrates a material image 300 showing a certain landscape. As illustrated in FIG. 27A, the material image 300 includes a three people image 301, a background image 302 including the ground and the sky and a sun image 303. The image 301, background image 302 and the image 303 are separated into different layers. Further, the number of divisions of each layer is 484 in total including 22 in the vertical direction and 22 in the horizontal direction. Furthermore, a display order is not set to each layer.

Figure 27B:
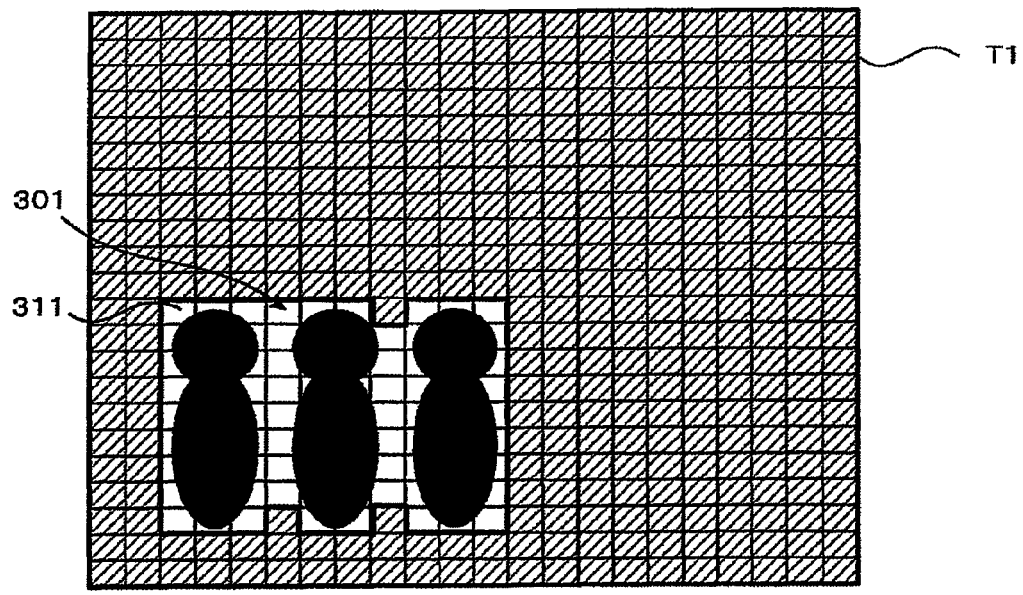
FIG. 27B illustrates an example of a layer T1.

FIG. 27B is an example of a layer T1. As illustrated in FIG. 27B, the layer T1 includes the three people image 301 as a layer image. An image area 311 in the layer T1 is set to only divided areas including the image 301. The Z order of the layer T1 is set to the first.

Figure 28A:
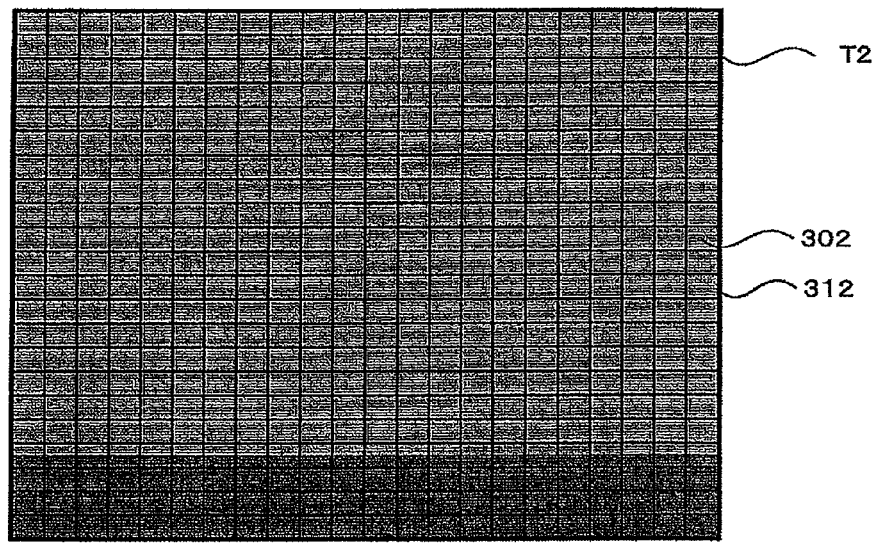
FIG. 28A illustrates an example of a layer T2.

FIG. 28A is an example of a layer T2. As illustrated in FIG. 28A, the layer T2 includes the background image 302 as a layer image. Although part of the background image 302 is hidden by the image 301 and the image 303 in the material image 300, the entire image 303 is seen in the layer T2. An image area 312 in the layer T2 is set to the entire layer T2. The Z order of the layer T2 is set to the third.

Figure 28B:
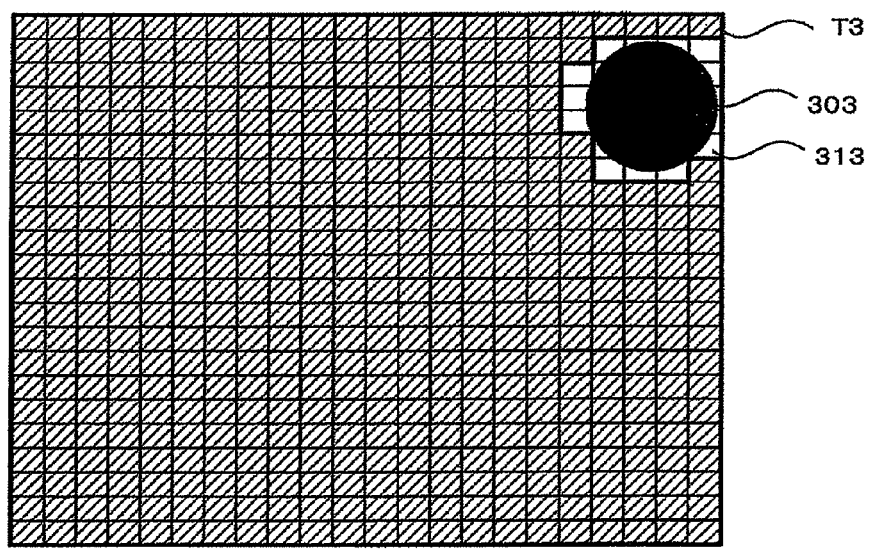
FIG. 28B illustrates an example of a layer T3.

FIG. 28B is an example of the layer T3. As illustrated in FIG. 28B, the layer T3 includes the sun image 303 as a layer image. An image area 313 in the layer T3 is set to only divided areas including the image 303. The Z order of the layer T3 is set to the second.

Similar to the first embodiment, the system control unit 15 allocates a posting image received from the user terminal 2-k, to a divided area of divided areas in the image area of each layer having color information which approximates to color information of the posting image.

Figure 29A:
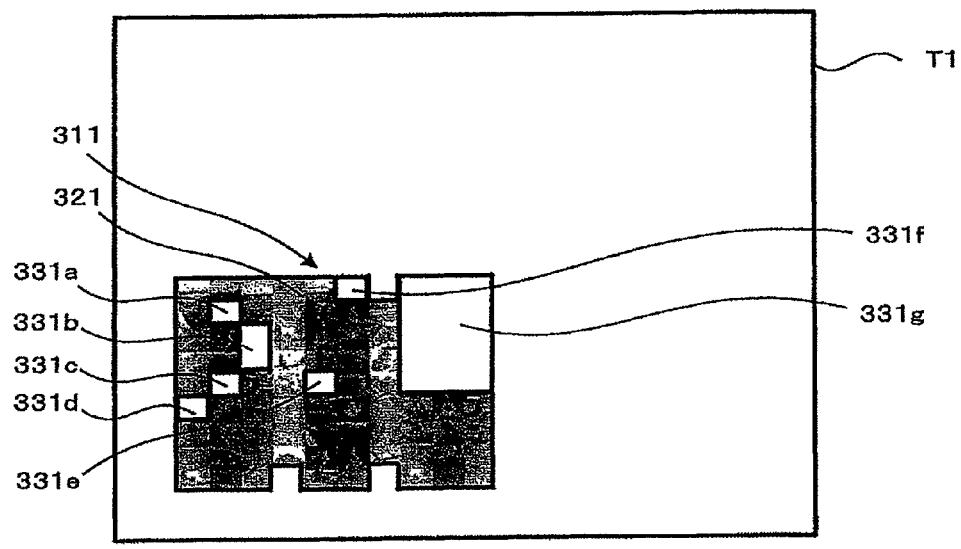
FIG. 29A illustrates an example of a mosaic image 321 of the layer T1.

FIG. 29A illustrates an example of a mosaic image 321 of the layer T1. As illustrated in FIG. 29A, the mosaic image 321 of the layer T1 imitates the three people image 301. Meanwhile, posting images are not allocated to areas 331a to 331g in the image area 311.

Figure 29B:
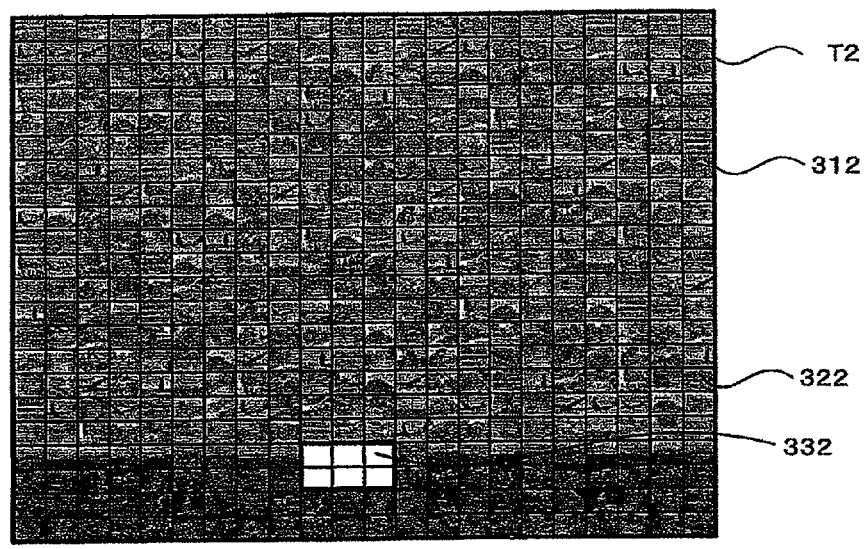
FIG. 29B illustrates an example of a mosaic image 322 of the layer T2.

FIG. 29B illustrates an example of a mosaic image 322 of the layer T2. As illustrated in FIG. 29B, the mosaic image 322 of the layer T2 imitates the background image 302. Meanwhile, a posting images is not yet allocated to an areas 332 in the image area 312. In addition, even one posting image is not yet allocated in the layer T3.

Meanwhile, the mosaic image 321 and the mosaic image 322 are compared. Then, posting images are allocated to divided areas at the same display positions as the areas 331a to 331g in the layer T2. Further, a posting image is allocated to a divided area at the same display position as the area 332 in the layer T1. When the layers T1 and T2 are superimposed, posting images are allocated to all divided areas in the image area 311 of the layer T1, and posting images are allocated to all divided areas in the image area 312 of the layer T2. That is, missing images are compensated for by the layers T1 and T2.

Hence, when posting images can be allocated to all divided areas in image areas of a plurality of layers, the system control unit 15 generates a mosaic image by superimposing posting images allocated in a plurality of these layers.

Figure 30A:
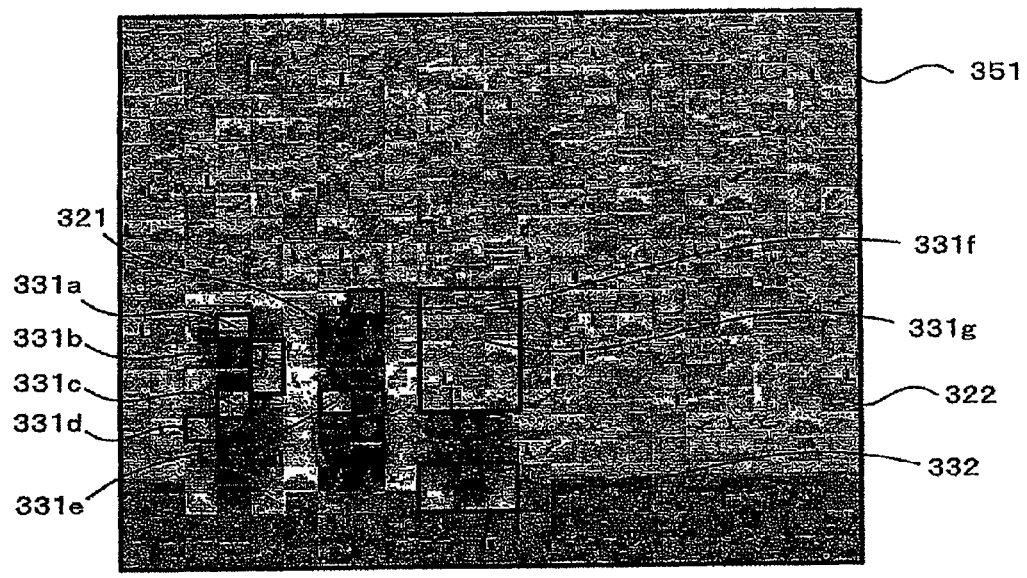
FIG. 30A illustrates an example of a mosaic image 351 generated using posting images allocated to the layers T1 and T2.

FIG. 30A illustrates an example of a mosaic image 351 generated using posting images allocated to the layers T1 and T2. As illustrated in FIG. 30A, the mosaic image 351 includes the mosaic image 321 and the mosaic image 322.

Although the mosaic image 321 of the layer T1 is not completed as a mosaic image which imitates the three people image 301, the divided areas in the image area 321 are filled with all posting images. Consequently, it is possible to avoid giving an incomplete impression to users.

Further, an area 332 in the image area 322 of the layer T2 is hidden by the mosaic image 321 of the layer T1. That is, image missing portions in the mosaic image 322 are not seen on the mosaic image 351. Hence, the mosaic image which imitates the background image 302 is seemingly completed. Consequently, it is possible to avoid giving an incomplete impression to users.

The system control unit 15 allocates a posting image received from the user terminal 2-k, to a divided area of divided areas in the image area of each layer having color information which approximates to color information of the posting image. Meanwhile, the system control unit 15 updates a mosaic image when, for example, a posting image is allocated to one of the areas 331a to 331g of the layer T1. By this means, a mosaic image which imitates the three people image 301 is gradually completed.

Further, in the layer T2, a posting image is allocated to a divided area at the same display position as each divided area in the image area 313 of the layer T3. Hence, when even one posting image is allocated to the image area 313 of the layer T3, the system control unit 15 generates a mosaic image by superimposing posting images allocated to the layers T1 to T3.

Figure 30B:
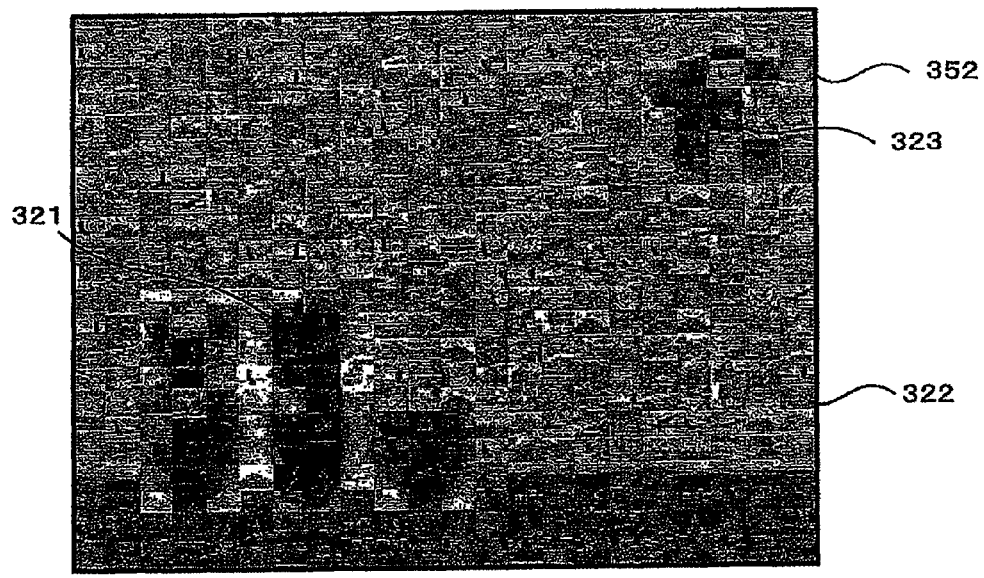
FIG. 30B illustrates an example of a mosaic image 352 generated using posting images allocated to layers T1 to T3.

FIG. 30B illustrates an example of a mosaic image 352 generated using posting images allocated to the layers T1 to T3. As illustrated in FIG. 30B, the mosaic image 351 includes the mosaic image 321, the mosaic image 322 and the mosaic image 323. The mosaic image 323 imitates the sun image 303. Although the mosaic image 323 is not completed as a mosaic image which imitates the sun 303, the divided areas in the image area 313 are filled with all posting images. Consequently, it is possible to avoid giving an incomplete impression to users.

Next, a specific operation of the information providing device 1 will be described. Hereinafter, differences of processing upon reception of a posting image and mosaic image generation processing from the first embodiment will be mainly described.

First, the processing upon reception of a posting image will be described using FIG. 18. With the present embodiment, the system control unit 15 does not use a mosaic image generation flag. Therefore, the system control unit 15 does not execute steps S51, S67 and S70 illustrated in FIG. 18.

When deciding in step S68 that all layers are selected (step S68: YES), the system control unit 15 decides whether or not the currently received posting image is allocated to a divided area of one or more layers (step S71). Further, when deciding that the currently received posting image is allocated to the divided area of one or more material images (step S71: YES), the system control unit 15 decides whether or not to execute mosaic image generation processing. In addition, this decision processing will be described in detail. In this case, when deciding to execute the mosaic image generation processing, the system control unit 15 executes the mosaic image generation processing (step S73), and proceeds to step S74. By contrast with this, when deciding not to execute the mosaic image generation processing, the system control unit 15 proceeds to step S74.

Next, processing of deciding whether or not to execute the mosaic image generation processing will be described in detail. More specifically, the system control unit 15 decides whether or not there are a set of layers (hereinafter, "layer group") satisfying a condition for generating a mosaic image. The number of layers is M. The number of layer groups which are decision targets correspond to the number of combinations for which 1 to m layers are selected from M layers. With examples in FIGS. 27 and 28, there are seven combinations of layer groups of decision targets including only the layer T1, only the layer T2, only the layer T3, the layer T1 and the layer T2, the layer T2 and the layer T3, the layer T1 and the layer T3, and the layers T1 to T3.

In addition, a combination to select when the display order is set to each layer is limited to a layer group of a display order next to the first display order. With examples illustrated in FIGS. 6 and 7, there are three combinations including only the layer L1, the layers L1 and L2, and the layers L1 to L3.

The system control unit 15 selects one layer group from the layer groups of decision targets. Next, the system control unit 15 decides whether or not posting images are allocated to all divided areas in the image area of each layer included in the selected layer group. In this case, a layer in which posting images are allocated to all divided areas in an image area satisfies a precondition for executing the mosaic image generation processing. When, for example, a combination of the layers T1 and T2 is selected as a layer group, whether or not posting images are allocated to all divided areas in the image area 311 of the layer T1 and whether or not posting images are allocated to all divided areas in the image area 312 of the layer T2 are decided. In addition, when posting images are allocated to all divided areas in image areas in all layers included in the selected layer group, a condition for executing the mosaic image generation processing according to the first embodiment is satisfied. By contrast with this, the system control unit performs the following decision for a layer in which there is a divided area to which a posting image is not allocated in an image area.

More specifically, the system control unit 15 specifies a divided area to which a posting image is not allocated in an image area. Whether or not a posting image is allocated to a divided area and one of other layers having a display position which overlaps the divided area of the specified divided areas is decided. One of the other layers in this case refers to a layer other than layers for which a divided area to which a posting image is not allocated in an image area is specified among layers included in the selected layer group.

When, for example, the combination of the layers T1 and T2 is selected as a layer group, there are the areas 331a to 331g to which posting images are not allocated in the image area 311 of the layer T1. Hence, whether or not a posting image is allocated to a divided area having the same display position as each of divided area in the areas 331a to 331g in the layer T2 is decided. In this case, even when posting images are allocated to divided areas of the layer T3, allocation of a posting image to a divided area having the same display position as each divided area in the areas 331a to 331g in the layer T3 is not taken into account. The combination of the layers T1 to T3 is taken into account for the layer T3.

Meanwhile, layers for which it is decided that posting images are allocated to divided areas of one of other layers having display positions which overlap all specified divided areas satisfy a precondition for executing the mosaic image generation processing.

In addition, when the selected layer group includes only one layer, processing of deciding whether or not the condition for generating a mosaic image is satisfied is directed to deciding whether or not posting images are substantially allocated to all divided areas in an image area of the layer. When, for example, only the layer T1 is selected as a layer group, and only when posting images are allocated to all divided areas in the image area of the layer T1, the layer T1 satisfies a condition for generating a mosaic image.

When deciding that all layers included in the selected layer group satisfy a precondition for executing mosaic image generation processing, the system control unit 15 decides that the selected layer group satisfies the condition for executing the mosaic image generation processing. By contrast with this, when deciding that there is a layer which does not satisfy the precondition for executing mosaic image generation processing among layers included in the selected layer group, the system control unit 15 decides that the selected layer group does not satisfy the condition for executing the mosaic image generation processing.

The system control unit 15 performs such decision for each layer group. Further, when deciding that there are one or more layer groups which satisfy the condition for executing the mosaic image generation processing, the system control unit 15 executes the mosaic image generation processing. By contrast with this, when deciding that there is not even one layer group which satisfies the condition for executing the mosaic image generation processing, the system control unit 15 does not execute the mosaic image generation processing.

Next, the mosaic image generation processing will be described using FIGS. 20 and 21. In the mosaic image generation processing, the system control unit 15 does not execute processings in step S101 to S109 illustrated in FIG. 20. Alternatively, the system control unit 15 selects a layer group used for the mosaic image generation processing.

More specifically, when there is only one layer group which satisfies the condition for executing the mosaic image generation processing, the system control unit 15 generates a layer list listing layers included in the layer group. By contrast with this, when there are a plurality of layer groups which satisfy the condition for executing the mosaic image generation processing, the system control unit 15 selects a layer group including the greatest number of layers among the layer groups which satisfy the condition. Further, the system control unit 15 generates a layer list listing layers included in the selected layer group. In addition, when there are a plurality of layer groups including the greatest number of layers, the system control unit 15 selects a random layer group from a plurality of layer groups. When selecting a layer group used for the mosaic image generation processing, the system control unit 15 stores information of the selected layer group in the memory unit 14. For example, the system control unit 15 associates and stores a layer ID of each layer included in the selected layer group. This information is used to decide a condition for generating a mosaic image next.

Subsequently, similar to the first embodiment, the system control unit 15 generates a mosaic image based on the generated layer list (steps S110 to S119 in FIG. 20 and FIG. 21).

Subsequently, the system control unit 15 decides whether or not to execute the mosaic image generation processing every time a received posting image is allocated in an image area of one layer. In this case, the system control unit 15 decides whether or not to update a mosaic image generated once. Hence, decision as to whether or not to execute the mosaic image generation processing after a mosaic image is generated once is slightly different from the above decision.

Firstly, a layer group for which whether or not the layer group satisfies the condition for generating a mosaic image is limited. More specifically, the system control unit 15 decides whether or not a layer group which includes a layer group selected as a layer group used to generate a mosaic image the last time and which includes a greater number of layers than the layer group satisfies the condition for generating the mosaic image. When, for example, the layer T1 is selected as the layer group used to generate a mosaic image the last time, the layer groups which are decision targets this time include the layer T1 and the layer T2, the layer T1 and the layer T3, and the layers T1 to T3. Further, when, for example, the layer T1 and the layer T2 are selected as the layer group used to generate a mosaic image the last time, the layer group which is a decision target this time includes the layers T1 to T3.

The system control unit 15 executes the mosaic image generation processing when there is a layer group which satisfies the condition for generating a mosaic image among the limited layer groups. For example, the layer T1 and the layer T2 are selected as the layer group used to generate a mosaic image, the mosaic image 351 illustrated in FIG. 30A is generated, and then the layers T1 to T3 satisfy a condition for generating a mosaic image. In this case, for example, the mosaic image 352 illustrated in FIG. 30B is generated.

Secondly, when there is not even one layer group which satisfies the condition for generating a mosaic image among the limited layer groups, the mosaic image generation processing is executed in some cases. More specifically, the system control unit 15 generates a mosaic image when allocating the currently received posting image to one layer included in the layer group selected as a layer group used to generate a mosaic image this time. For example, the layer T1 and the layer T2 are selected as a layer group used to generate a mosaic image, the mosaic image 351 illustrated in FIG. 30A is generated, and then the currently received posting image is allocated to the area 331a of the layer T1. In this case, a mosaic image in which a posting image is newly allocated to the area 331a is generated for the mosaic image 352 illustrated in FIG. 30A.

As described above, according to the present embodiment, the system control unit 15 acquires a posting image from the user terminal 2-k through the network, specifies in units of divided areas an image area in which an image is drawn in each layer of a plurality of layers which configure a material image which is a source of a mosaic image, and which are divided into a plurality of divided areas, and allocates the acquired posting image to a divided area in the image area of one layer based on color information of the acquired posting image and color information of each divided area in the specified image area. Further, the system control unit 15 generates a mosaic image by superimposing between layer images allocated in image areas of two or more layers allocated to at least one of all divided areas in an image area and divided areas of another layer having display positions which overlap the divided areas among a plurality of layers configuring a material image.

Consequently, it is possible to generate a mosaic image without image defect portions as a mosaic image which imitates an image configuring a material image, and generate the mosaic image as a more perfect mosaic image which imitates a material image.

In addition, with the above embodiments, the system control unit 15 generates table part data as a mosaic image. However, the system control unit 15 may generate image data of a mosaic image by, for example, synthesizing posting images allocated to divided areas of each layer.

Further, the number of divisions of each layer configuring a material image may not be same between the layers. In this case, the number of divisions is registered in the material image DB 142 per layer information.

REFERENCE SIGNS LIST

1 INFORMATION PROVIDING DEVICE
2-k USER TERMINAL
11, 23 COMMUNICATION UNIT
12, 22 DISPLAY UNIT
13, 21 OPERATION UNIT
14, 25 MEMORY UNIT
15, 27 SYSTEM CONTROL UNIT
16, 28 SYSTEM BUS
17, 26 INPUT/OUTPUT INTERFACE UNIT
24 DRIVE UNIT
NW NETWORK

The invention claimed is:

1. An image generation device, comprising:
at least one processor which implements:
an acquiring unit that acquires a posting image posted by a user from a terminal device through a network;
a specifying unit that specifies, in units of divided areas, an image area in which a layer image is drawn in each layer of a plurality of layers which configure a material image which is a source of a mosaic image, wherein each layer is divided into a plurality of divided areas;
an allocating unit that allocates the posting image acquired by the acquiring unit to a divided area in the image area of one of the plurality of layers, based on color information of the posting image acquired by the acquiring unit and color information of each of the divided areas in the image area specified by the specifying unit; and
a generating unit that generates the mosaic image by superimposing, between layers, layer images of at least two layers of the plurality of layers in which posting images are allocated to all of the divided areas in the image area of at least one layer and all of divided areas of other layer comprising a first display position which overlaps the divided areas of the at least one layer, or by superimposing, between layers, layer images of at least two layers of the plurality of layers wherein posting images are allocated to at least one divided area of the divided areas in the image area of at least one layer and an overlapping divided area of divided areas of other layer comprising a second display position which overlaps the divided areas of the at least one layer, wherein the layer images of the at least two layers are superimposed in a Z order set to each layer, the Z order indicating an order at which a layer is displayed in a Z axis direction.

2. The image generation device according to claim 1, wherein when allocation of an image in the image area of one of the plurality of layers is completed by the allocating unit, the generating unit generates a first mosaic image configured with the image allocated in the image area of the layer, and after the first mosaic image is generated, when a number of layers for which allocation of the image in the image area is completed increases in proportion to an increase in a number of images acquired by the acquiring unit, the generating unit generates a second mosaic image by superimposing between layers an image allocated in the image area of each of the layers for which allocation of the image in the image area is completed.

3. The image generation device according to claim 2, further comprising an order information acquiring unit that acquires order information indicating a display order of each of the plurality of layers, wherein when allocation of the image in the image area of the layer of an earliest display order indicated by the order information among the plurality of layers is completed, the generating unit generates the first mosaic image configured with the image allocated in the image area of the layer, and the generating unit further generates the second mosaic image by superimposing between layers the image allocated in the image area of the layer following the earliest display order indicated by the order information among the layers for which allocation of the image in the image area is completed.

4. The image generation device according to a claim 1, further comprising a deciding unit that decides whether or not there is the divided area which is suitable to allocate the posting image acquired by the acquiring unit, based on color information of the posting image acquired by the acquiring unit and color information of each of the divided areas, wherein, when the deciding unit decides that there is not the divided area which is suitable to allocate the posting image acquired by the acquiring unit, the generating unit does not use the posting image acquired by the acquiring unit to generate the mosaic image.

5. The image generation device according to claim 1, wherein the acquiring unit acquires identification information of the user who posts the posting image from the terminal device, and the image generation device further comprises an assigning unit that, when the allocating unit allocates the posting image acquired by the acquiring unit in the image area of the layer through which points are set to be assigned, updates point count information by adding a number of assigning points to a number of points indicated by the point count information associated with the identification information acquired by the acquiring unit, among the point count information stored in a point count information memory unit that associates and stores the point count information indicating the number of points assigned to the user, and the identification information of the user.

6. The image generation device according to claim 1, wherein the image generation device further comprises:
a mosaic image transmitting unit that transmits display information for displaying the mosaic image generated by the generating unit, to the terminal device through the network;
a receiving unit that receives request information which is transmitted from the terminal device when the user selects an image included in the mosaic image displayed on the terminal device based on the display information, and which indicates a request for a profile of the user who posts the selected image; and
a profile information transmitting unit that transmits profile information indicating the profile of the user matching the request information received by the receiving unit, to the terminal device which is a transmission source of the request information.

7. An image generation method in an image generation device which generates a mosaic image,
the image generation method comprising:
an acquiring step of, by at least one processor, acquiring an image from a terminal device through a network;
a specifying step of, by the at least one processor, specifying, in units of divided areas, an image area in which a layer image is drawn in each layer of a plurality of layers which configure a material image which is a source of a mosaic image, wherein each layer is divided into the plurality of divided areas;
an allocating step of, by the at least one processor, allocating the image acquired in the acquiring step to a divided area in the image area of one of the layers, based on color information of the image acquired in the acquiring step and color information of each of the divided areas in the image area specified in the specifying step; and
a generating step of, by the at least one processor, generating the mosaic image by superimposing, between layers, layer images of at least two layers of the plurality of layers in which images are allocated to all of the divided areas in the image area of at least one layer and all of divided areas of other layer comprising a first display position which overlaps the divided areas of the at least one layer,
or by superimposing, between layers, layer images of at least two layers of the plurality of layers wherein posting images are allocated to at least one divided area of the divided areas in the image area of at least one layer and an overlapping divided area of divided areas of other layer comprising a second display position which overlaps the divided areas of the at least one layer,
wherein the layer images of the at least two layers are superimposed in a Z order set to each layer, the Z order indicating an order at which a layer is displayed in a Z axis direction.

8. A non-transitory recording medium having a computer-readable image generation program recorded therein which causes a computer included in an image generation device which generates a mosaic image, to execute:
an acquiring step of acquiring an image from a terminal device through a network;

a specifying step of specifying, in units of divided areas, an image area in which a layer image is drawn in each layer of a plurality of layers which configure a material image which is a source of a mosaic image, wherein each layer is divided into the plurality of divided areas;

an allocating step of allocating the image acquired in the acquiring step to a divided area in the image area of one of the layers, based on color information of the image acquired in the acquiring step and color information of each of the divided areas in the image area specified in the specifying step; and a generating step of generating the mosaic image by superimposing, between layers, layer images of at least two layers of the plurality of layers in which images are allocated to at least one of all of the divided areas in the image area of at least one layer and all of divided areas of other layer comprising a first display position which overlaps the divided areas of the at least one layer, or by superimposing, between layers, layer images of at least two layers of the plurality of layers wherein posting images are allocated to at least one divided area of the divided areas in the image area of at least one layer and an overlapping divided area of divided areas of other layer comprising a second display position which overlaps the divided areas of the at least one layer, wherein the layer images of the at least two layers are superimposed in a Z order set to each layer, the Z order indicating an order at which a layer is displayed in a Z axis direction.

\* \* \* \* \*